US012646738B2

(12) United States Patent
    Kim et al.

(10) Patent No.: US 12,646,738 B2
(45) Date of Patent: Jun. 2, 2026

(54) MEANDERING CORRECTION DEVICE FOR ELECTRODE AND MEANDERING CORRECTION METHOD FOR ELECTRODE

(71) Applicant: LG ENERGY SOLUTION, LTD., Seoul (KR)

(72) Inventors: Dong Wook Kim, Daejeon (KR); Seung Hoon Choi, Daejeon (KR); Min Wook Kim, Daejeon (KR); Yong Gyun Lee, Daejeon (KR); Jong Sik Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 689 days.

(21) Appl. No.: 18/011,719

(22) PCT Filed: Feb. 22, 2022

(86) PCT No.: PCT/KR2022/002610
     § 371 (c)(1),
     (2) Date: Dec. 20, 2022

(87) PCT Pub. No.: WO2022/182106
     PCT Pub. Date: Sep. 1, 2022

(65) Prior Publication Data
     US 2023/0318019 A1     Oct. 5, 2023

(30) Foreign Application Priority Data

Feb. 26, 2021    (KR) ........................ 10-2021-0026290
    May 26, 2021    (KR) ........................ 10-2021-0067485
    May 26, 2021    (KR) ........................ 10-2021-0067489

(51) Int. Cl.
     *H01M 10/04*          (2006.01)

(52) U.S. Cl.
     CPC ..... *H01M 10/049* (2013.01); *H01M 10/0409* (2013.01); *H01M 10/0431* (2013.01)

(58) Field of Classification Search
     CPC   H01M 10/049; H01M 10/04; B65H 23/0204; B65H 23/032; B65H 23/038; G03G 15/755; Y02E 60/10; Y02E 70/50
     See application file for complete search history.

(56) References Cited

U.S. PATENT DOCUMENTS 4,959,040  A  *  9/1990  Gardner ................. G01D 15/28
                                                         198/807
    5,515,139  A  *  5/1996  Hou ..................... G03G 15/755
                                                         198/807
                        (Continued)

FOREIGN PATENT DOCUMENTS

CN          102259772 A     11/2011
    CN          103579660 A      2/2014
                        (Continued)

OTHER PUBLICATIONS

Extended European Search Report for European Application No. 22759966.9, dated Jul. 16, 2024.
                        (Continued)

*Primary Examiner* — Donghai D Nguyen
(74) *Attorney, Agent, or Firm* — Birch, Stewart, Kolasch & Birch, LLP

(57)          ABSTRACT

An apparatus and method for correcting meandering of an electrode are provided. An edge position of the electrode is feedback-controlled so that a determination edge position sensor (EPS) edge position value matches a determination EPS edge reference value, and each of a line edge position control (EPC) unit and an input clamp unit is feedback-controlled so that a direction in which the electrode is transferred from a line EPC roller is corrected and an input inclination of an input clamp roller is corrected by compar- (Continued)

ing pieces of data on the determination EPS edge position values when the determination EPS edge position values change over time to converge to the determination EPS edge reference value by the feedback control, and the determination EPS edge reference value.

18 Claims, 19 Drawing Sheets

(56) References Cited

U.S. PATENT DOCUMENTS

| | | | |
|---|---|---|---|
| 5,964,339 A * | 10/1999 | Matsuura | G03G 15/2017 |
| | | | 198/810.03 |
| 6,534,952 B1 | 3/2003 | Ishikawa et al. | |
| 6,600,507 B2 | 7/2003 | Sanchez et al. | |
| 7,668,491 B2 * | 2/2010 | Furuya | G03G 15/1615 |
| | | | 399/302 |
| 7,815,039 B2 | 10/2010 | Enomoto | |
| 8,459,640 B2 | 6/2013 | Ui | |
| 8,893,942 B2 | 11/2014 | Oh et al. | |
| 9,274,459 B1 * | 3/2016 | Tokoro | G03G 15/1615 |
| 2009/0278303 A1 | 11/2009 | Fuwa | |
| 2012/0043408 A1 | 2/2012 | Oh et al. | |
| 2014/0059875 A1 | 3/2014 | Yuhara et al. | |
| 2015/0323309 A1 | 11/2015 | Kabetani et al. | |
| 2019/0252729 A1 | 8/2019 | Fujiwake et al. | |
| 2023/0318010 A1 | 10/2023 | Kim et al. | |

FOREIGN PATENT DOCUMENTS

| | | | |
|---|---|---|---|
| CN | 203445187 A | 2/2014 | |
| CN | 106513443 A | 3/2017 | |
| CN | 110104474 A | 8/2019 | |
| JP | 9-221252 A | 8/1997 | |
| JP | 11-40144 A | 2/1999 | |
| JP | 2002-284415 A | 10/2002 | |
| JP | 2010-143709 A | 7/2010 | |
| JP | 4595500 B2 | 12/2010 | |
| JP | 2012-240067 A | 12/2012 | |
| JP | 2014-24662 A | 2/2014 | |
| JP | 5492351 B1 | 5/2014 | |
| JP | 5835146 B2 | 12/2015 | |
| JP | 2016-51645 A | 4/2016 | |
| JP | 2019-169263 A | 10/2019 | |
| JP | 6635203 B2 | 1/2020 | |
| KR | 10-2002-0053841 A | 7/2002 | |
| KR | 10-0507434 B1 | 8/2005 | |
| KR | 10-2009-0117633 A | 11/2009 | |
| KR | 10-2011-0128716 A | 11/2011 | |
| KR | 10-1113424 B1 | 3/2012 | |
| KR | 10-1190211 B1 | 10/2012 | |
| KR | 10-2013-0137229 A | 12/2013 | |
| KR | 10-1479723 B1 | 1/2015 | |
| KR | 10-1561445 B1 | 10/2015 | |
| KR | 10-1956763 B1 | 3/2019 | |
| KR | 10-2019-0059676 A | 5/2019 | |
| KR | 10-2080346 B1 | 2/2020 | |
| KR | 10-2020-0109042 A | 9/2020 | |
| KR | 10-2192738 B1 | 12/2020 | |

OTHER PUBLICATIONS

Extended European Search Report for European Application No. 22760021.0, dated Jul. 16, 2024.

Extended European Search Report for European Application No. 22760022.8, dated Jul. 16, 2024.

International Search Report (PCT/ISA/210) issued in PCT/KR2022/002610 mailed on Jun. 10, 2022.

U.S. Office Action for U.S. Appl. No. 18/011,632, dated Nov. 5, 2025.

U.S. Office Action for U.S. Appl. No. 18/011,720, dated Oct. 31, 2025.

* cited by examiner

【FIG. 1】
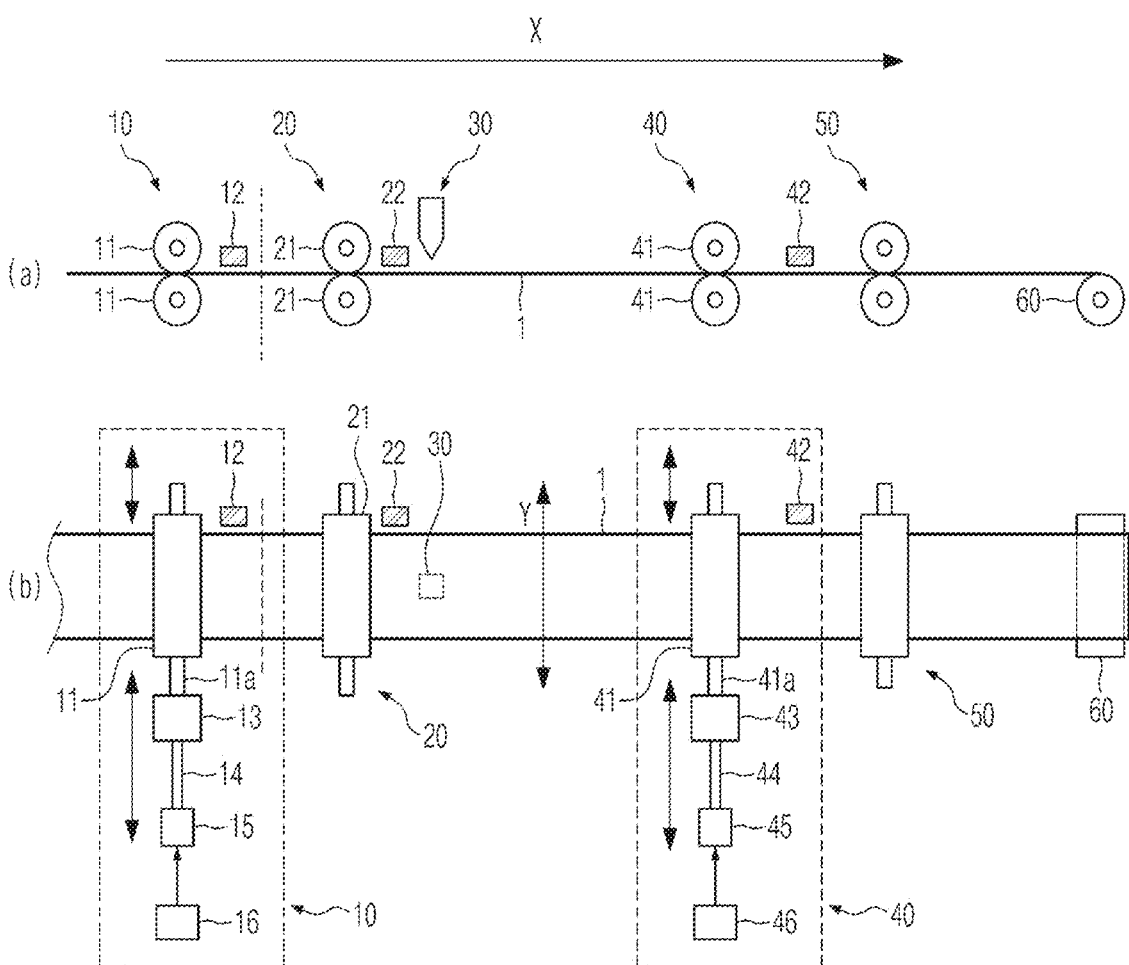
PRIOR ART

[FIG. 2]

PRIOR ART

PRIOR ART
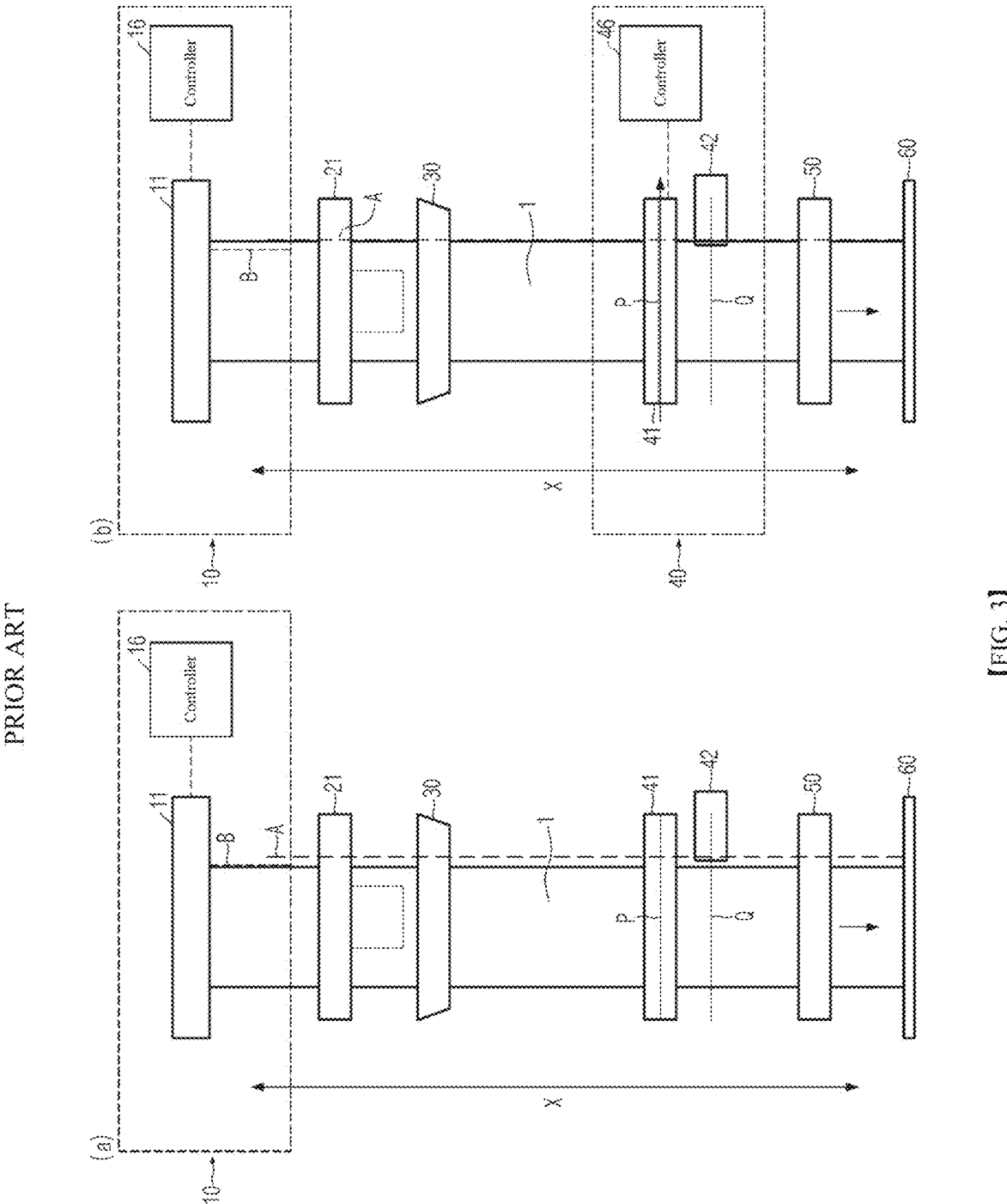
[FIG. 3]

PRIOR ART
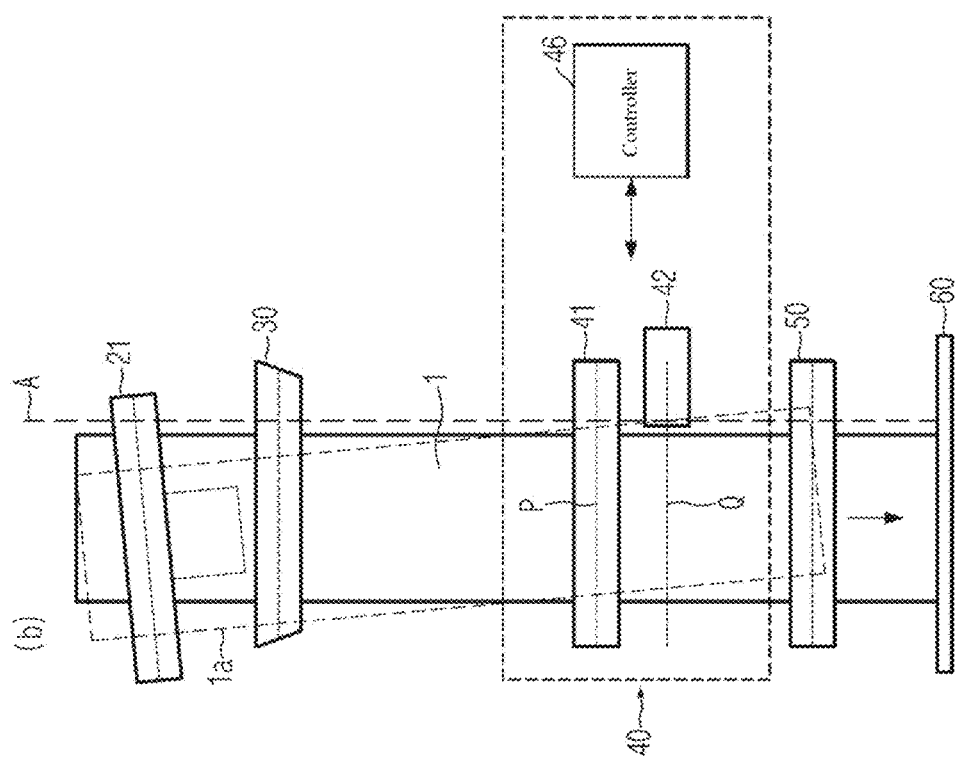
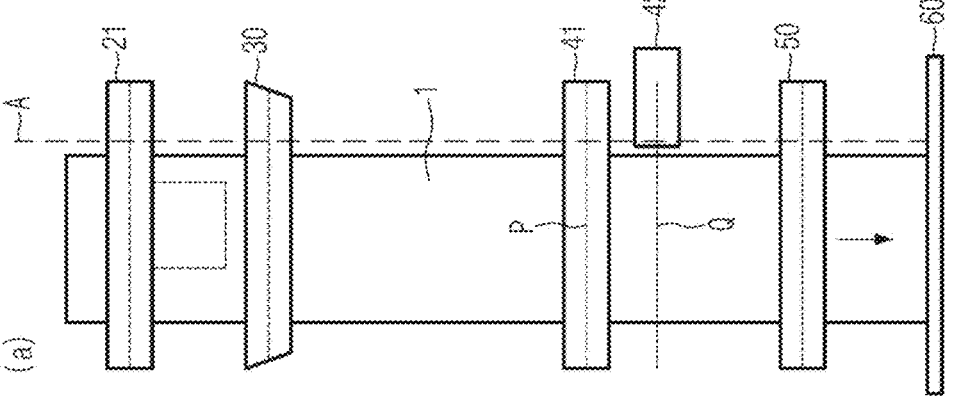
[FIG. 4]

[FIG. 5]
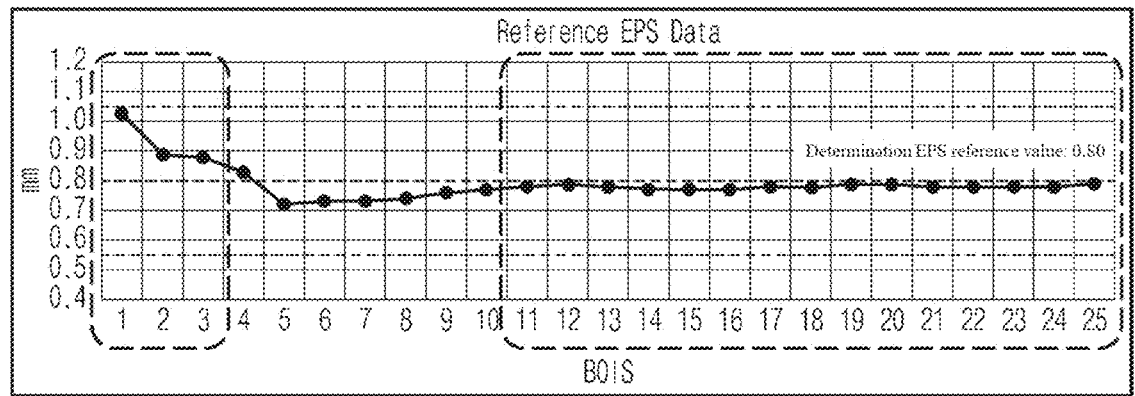
PRIOR ART

【FIG. 6】
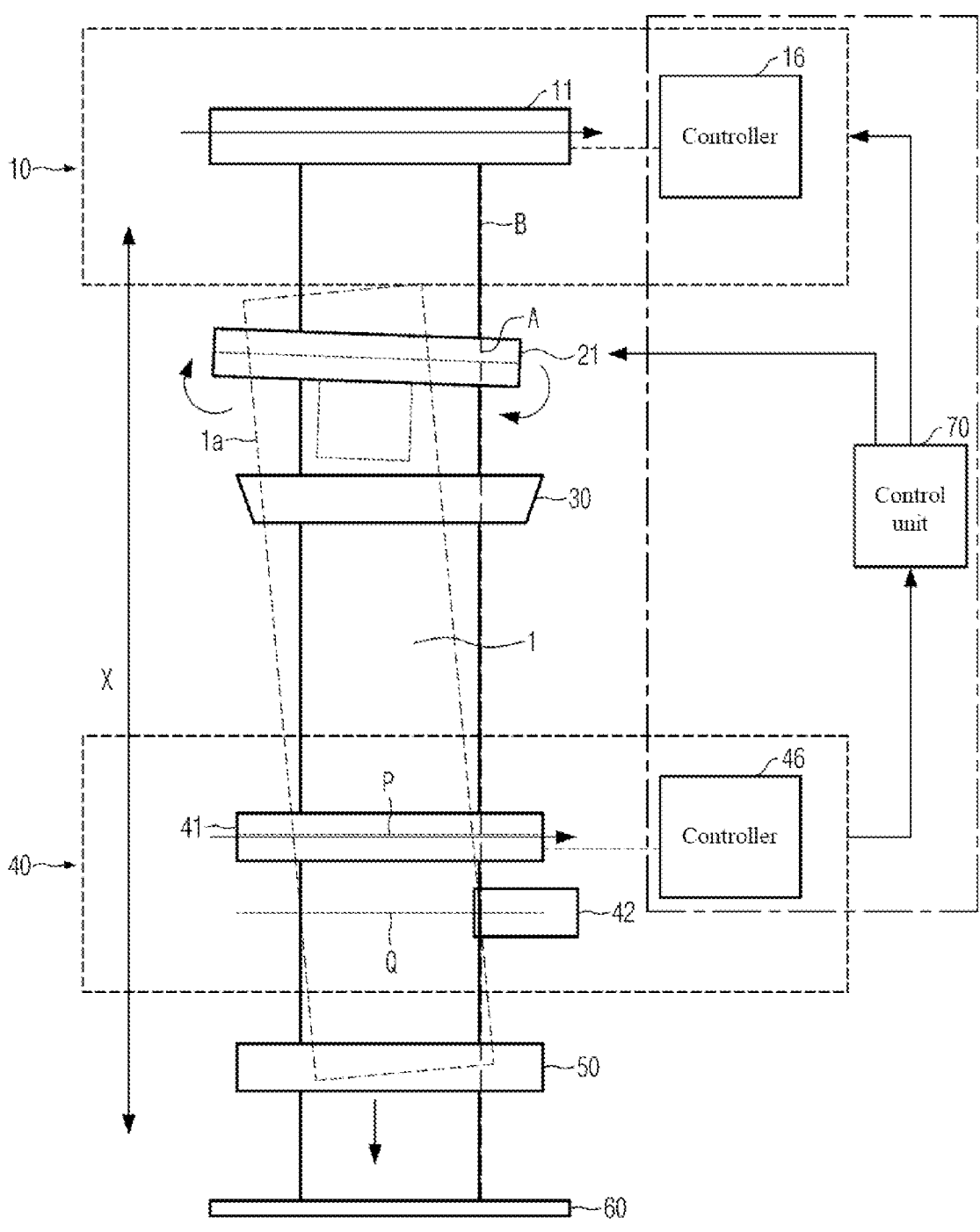

【FIG. 7】
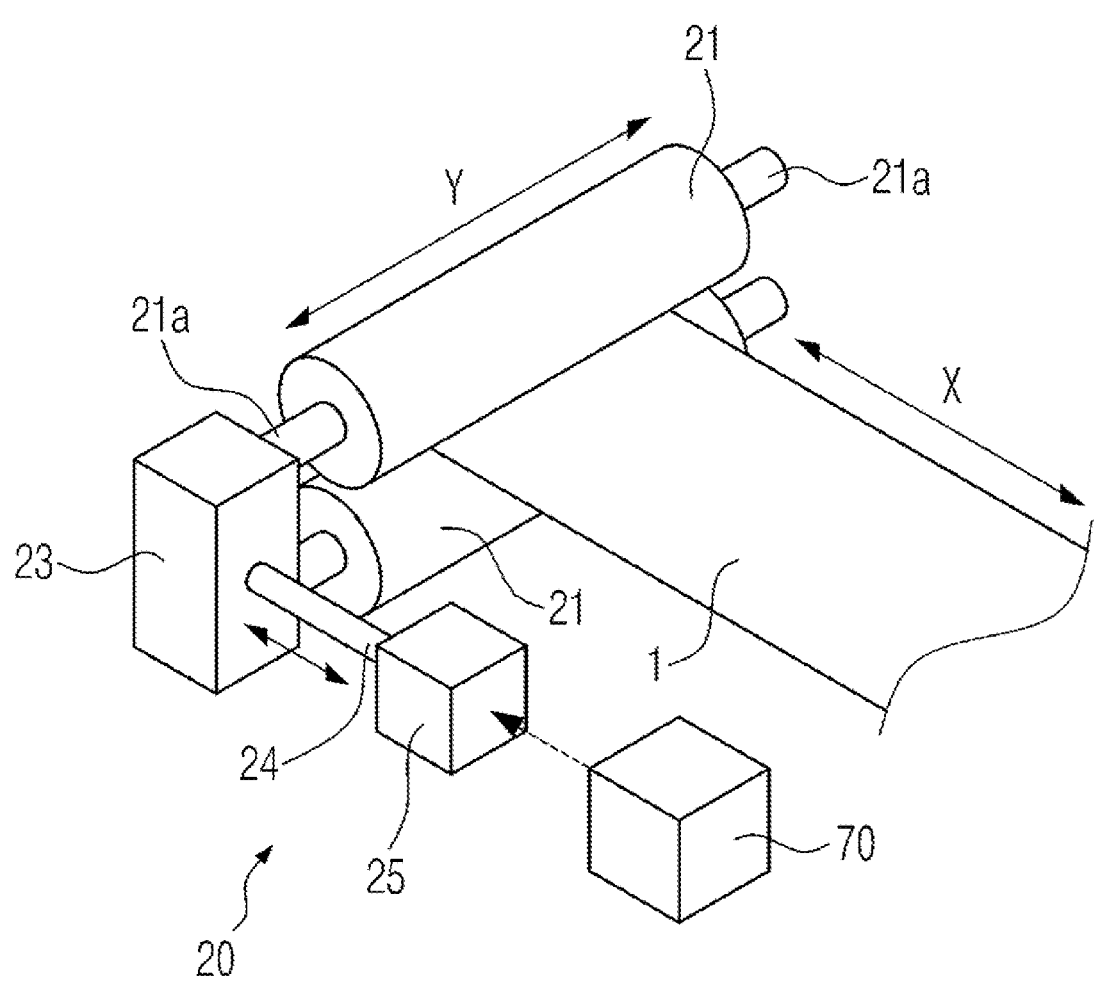

[FIG. 8]

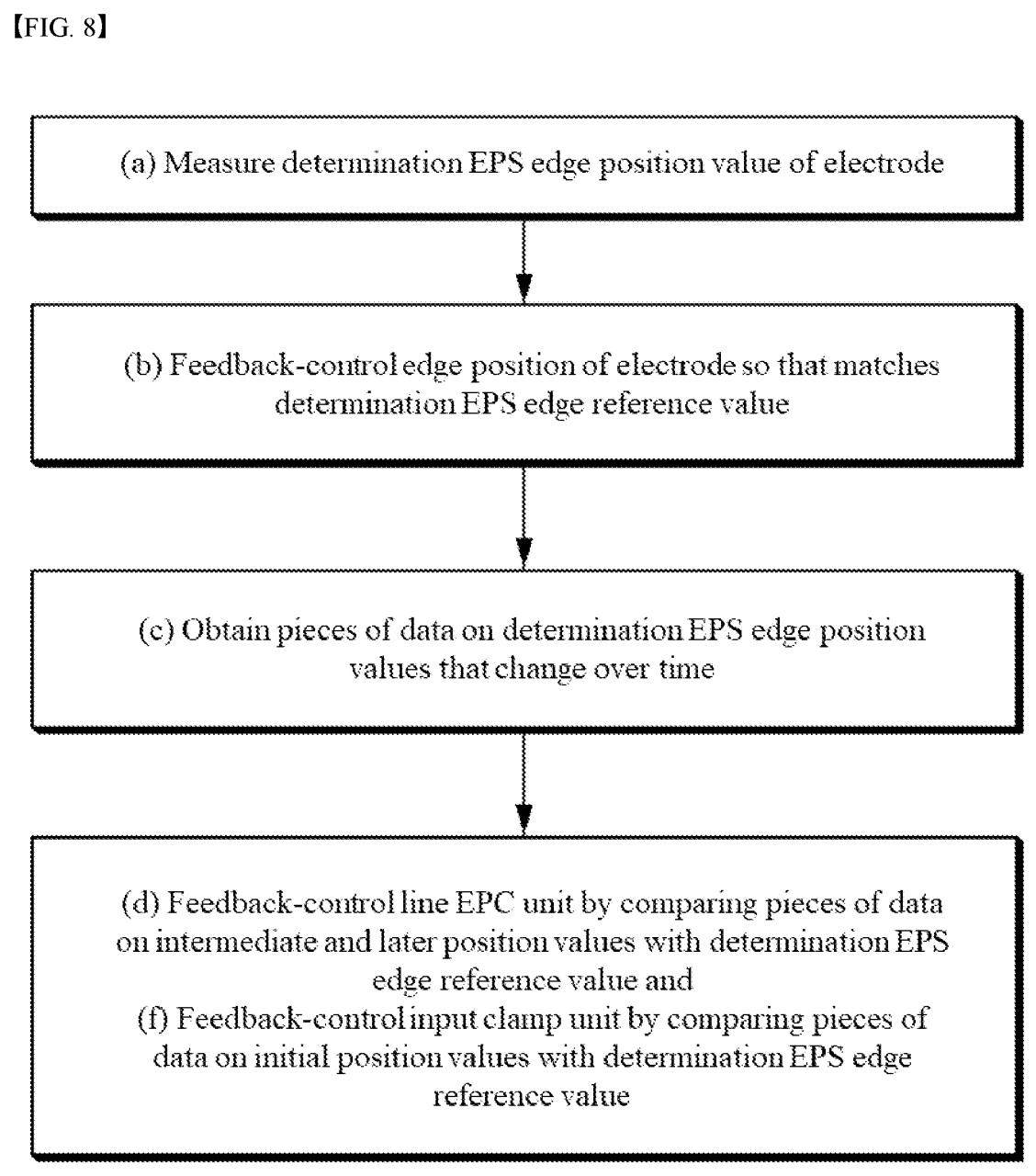

(a) Measure determination EPS edge position value of electrode (b) Feedback-control edge position of electrode so that matches determination EPS edge reference value (c) Obtain pieces of data on determination EPS edge position values that change over time (d) Feedback-control line EPC unit by comparing pieces of data on intermediate and later position values with determination EPS edge reference value and
(f) Feedback-control input clamp unit by comparing pieces of data on initial position values with determination EPS edge reference value

[FIG. 9]

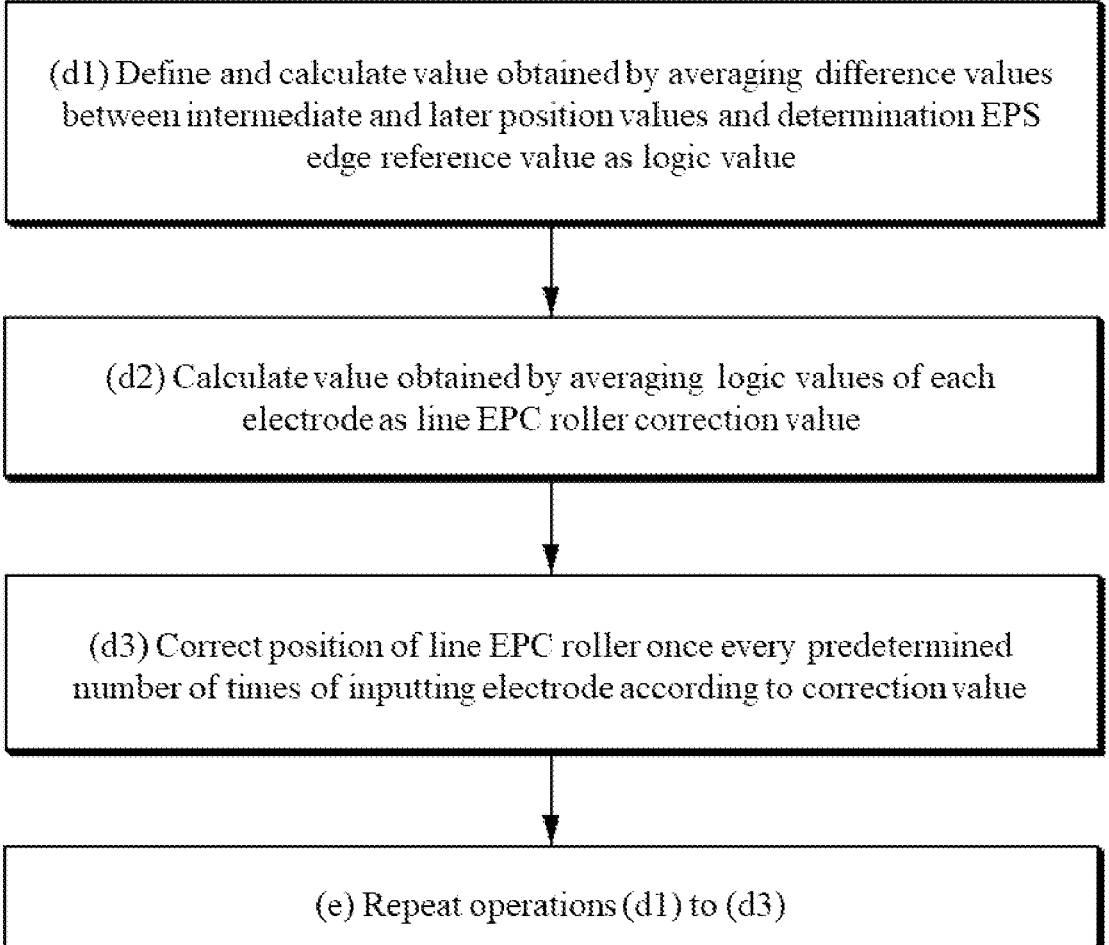

(d1) Define and calculate value obtained by averaging difference values between intermediate and later position values and determination EPS edge reference value as logic value (d2) Calculate value obtained by averaging logic values of each electrode as line EPC roller correction value (d3) Correct position of line EPC roller once every predetermined number of times of inputting electrode according to correction value (e) Repeat operations (d1) to (d3)

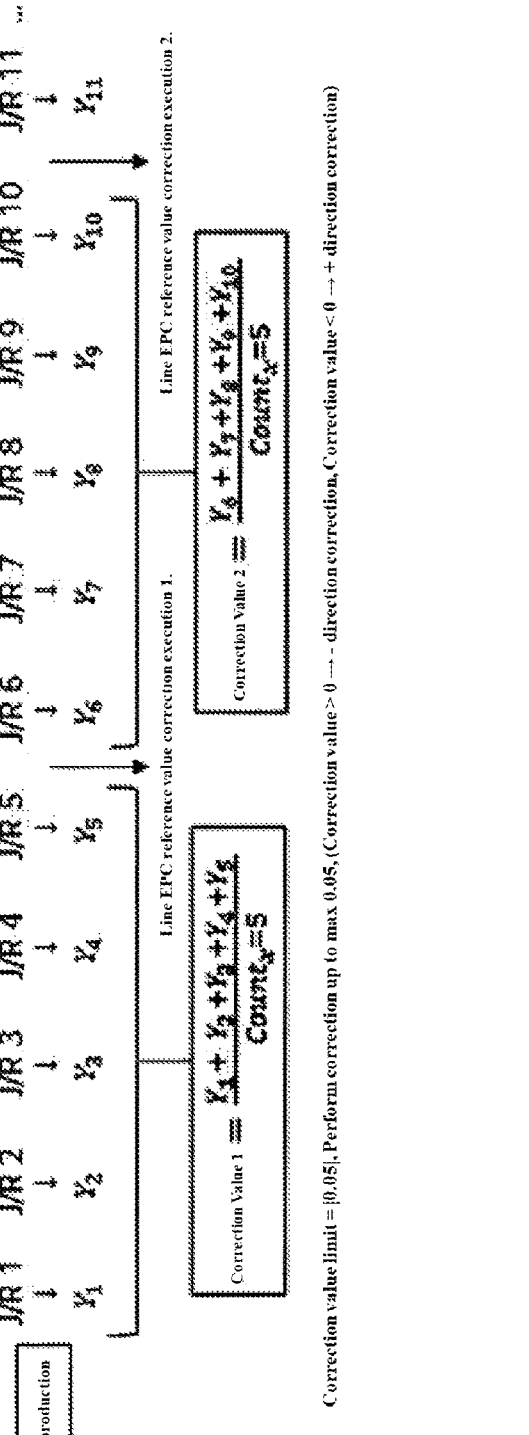
[FIG. 10]

【FIG. 11】

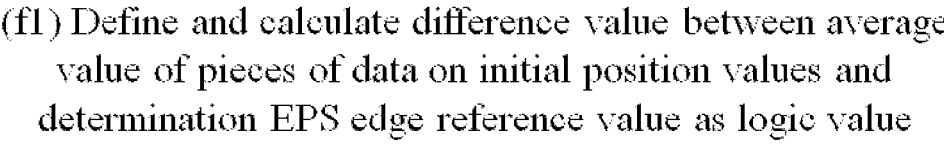

(f1) Define and calculate difference value between average value of pieces of data on initial position values and determination EPS edge reference value as logic value (f2) Calculate value obtained by averaging logic values of each electrode (f3) Correct input inclination by changing correction period according to magnitude of average logic value by as much as predetermined correction value (g) Repeat operations (f1) to (f3)

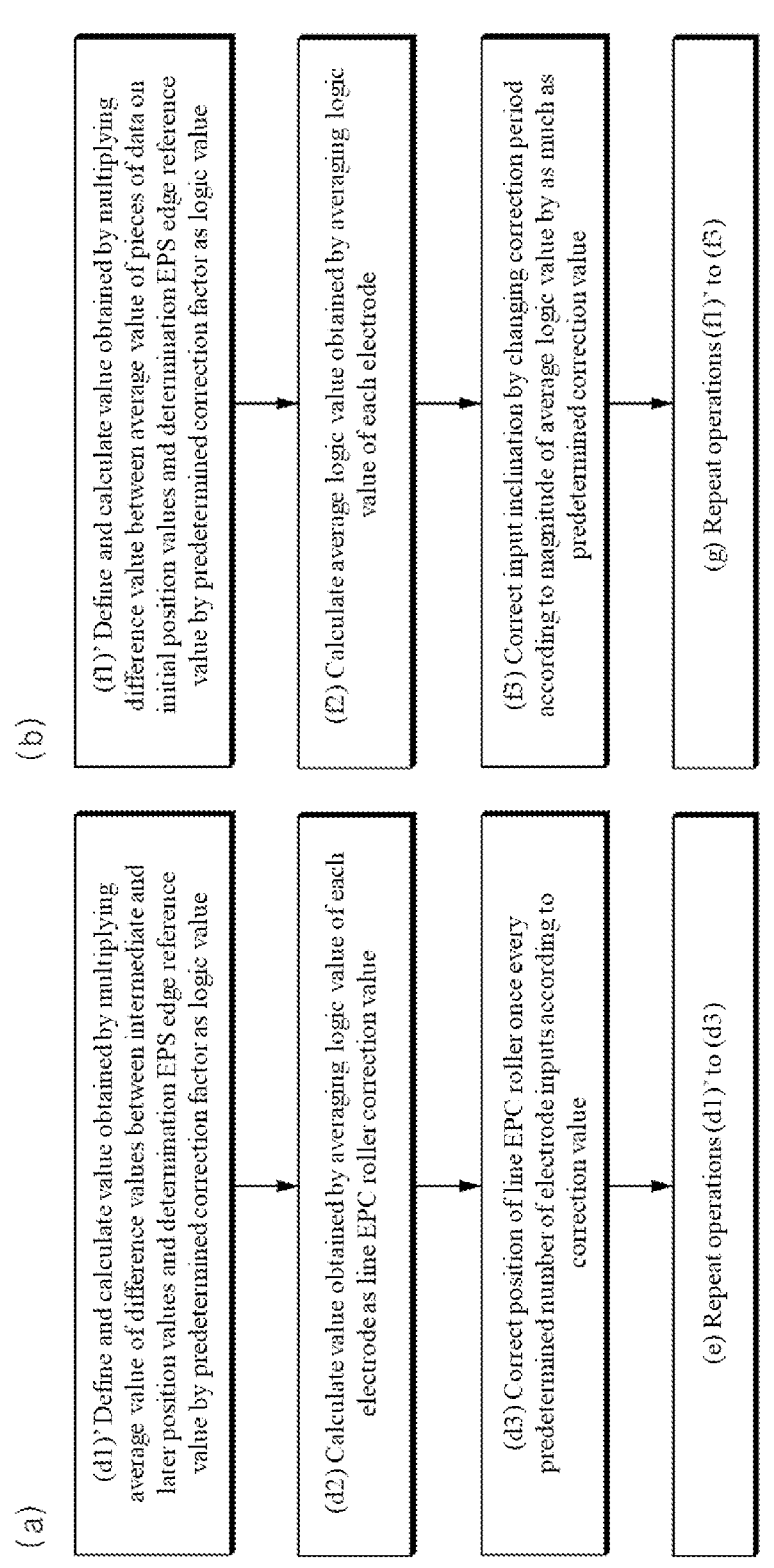
[FIG. 12]

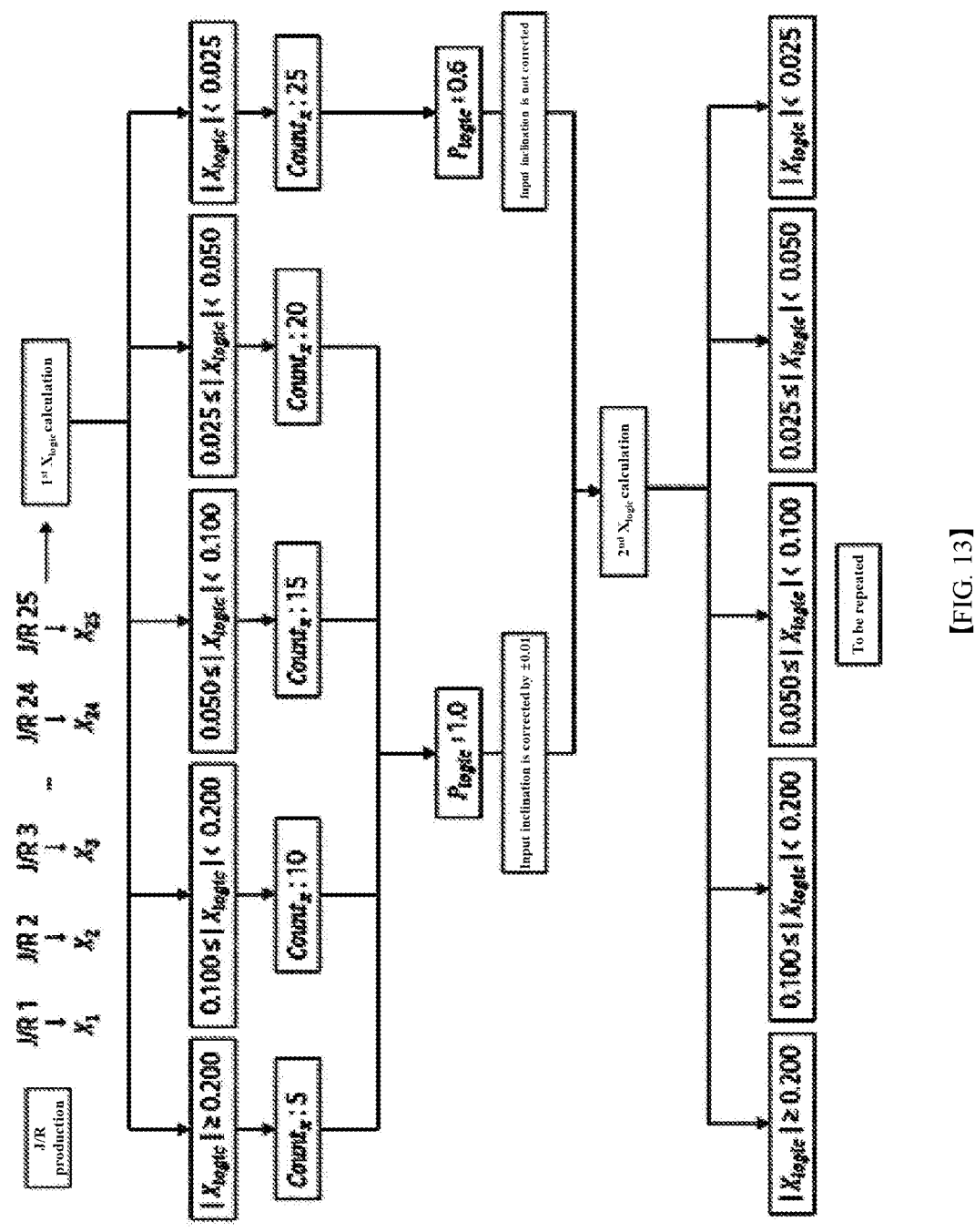
[FIG. 13]

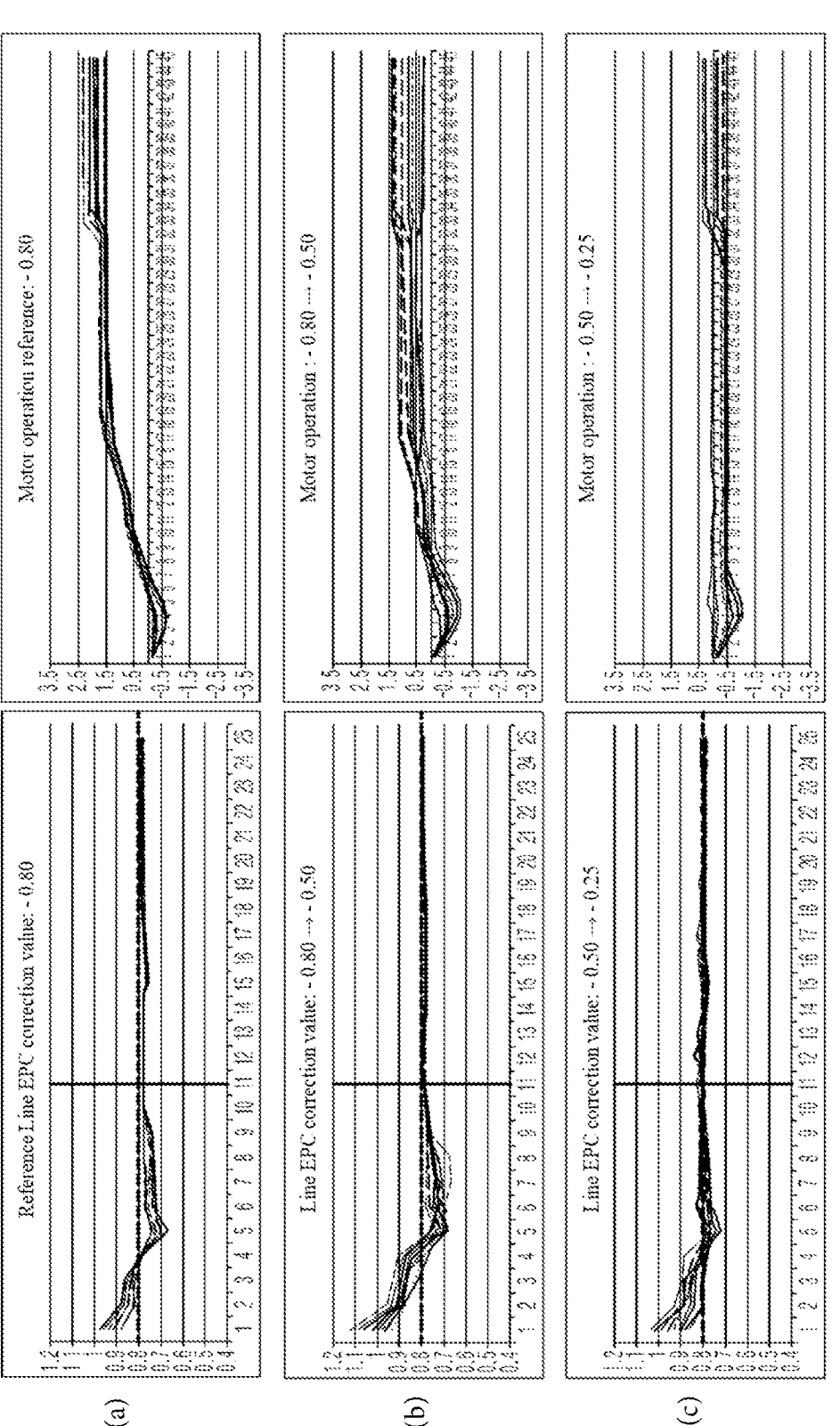
[FIG. 14]

【FIG. 15】
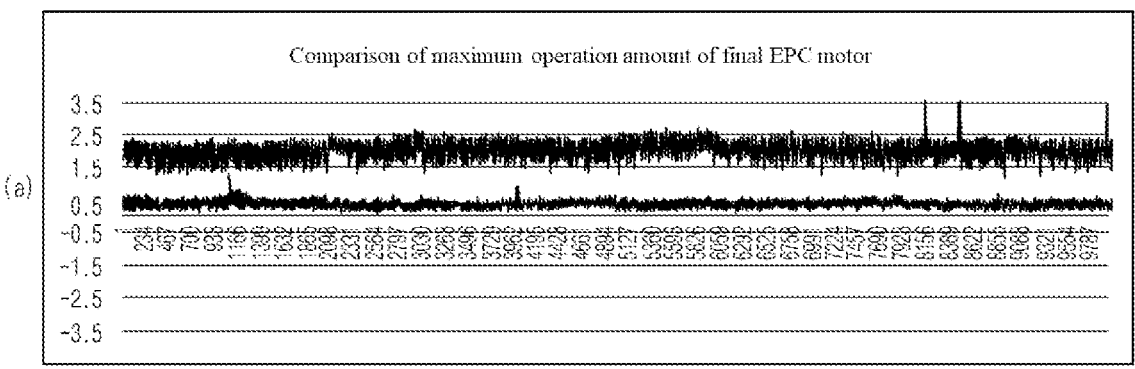
(a)
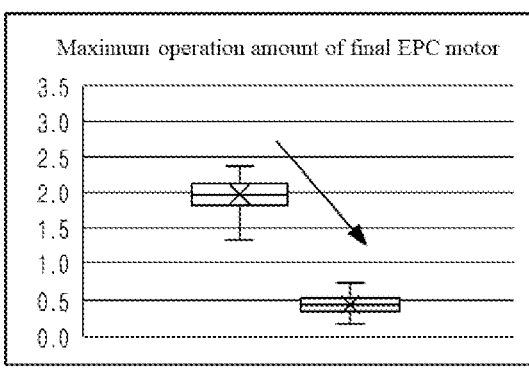
(b)

【FIG. 16】
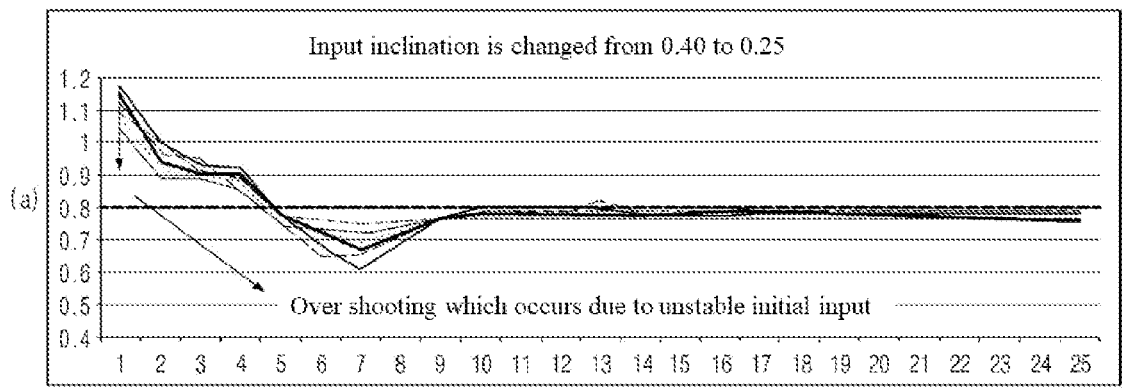
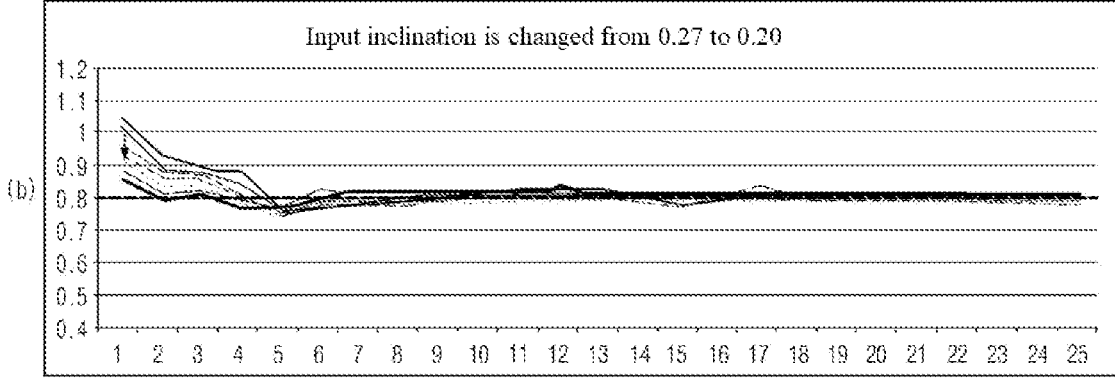
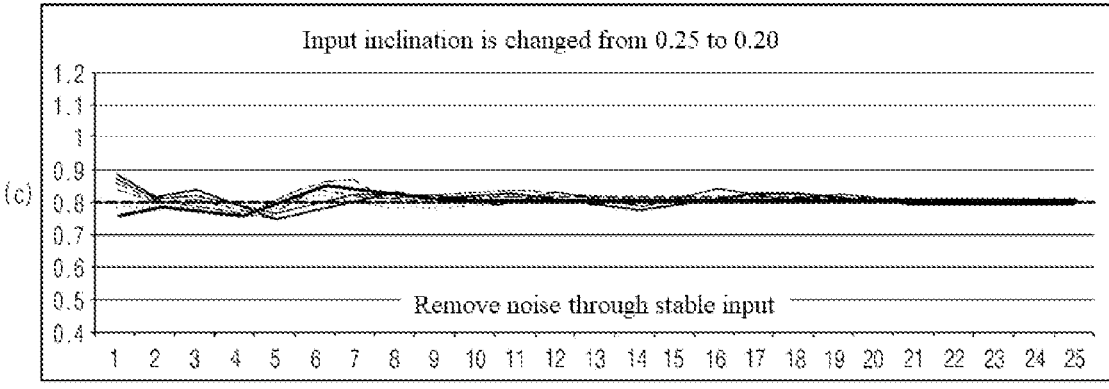

【FIG. 17】
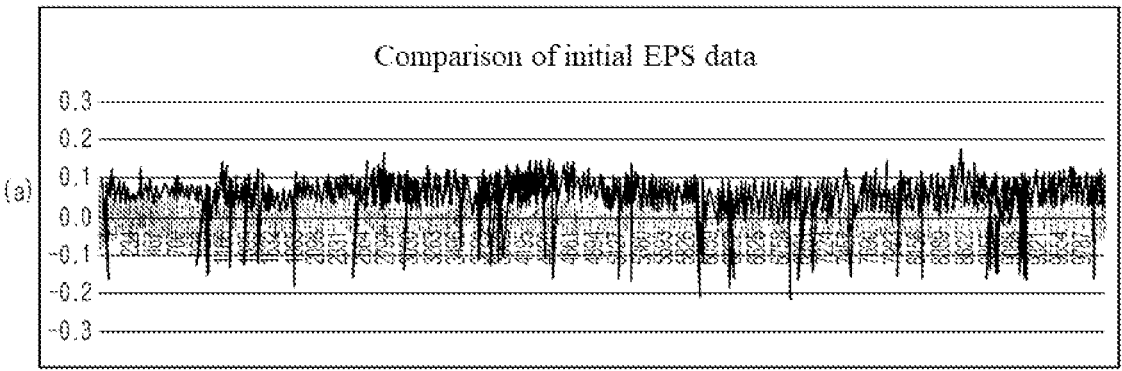
(a)
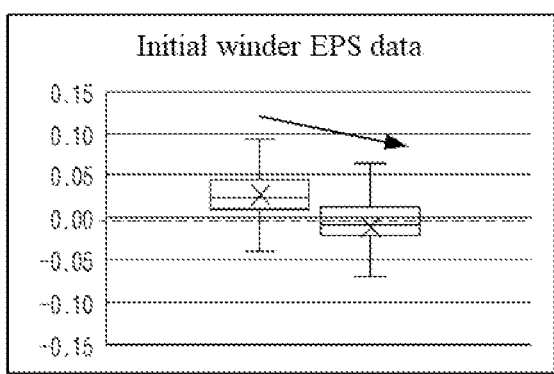
(b)

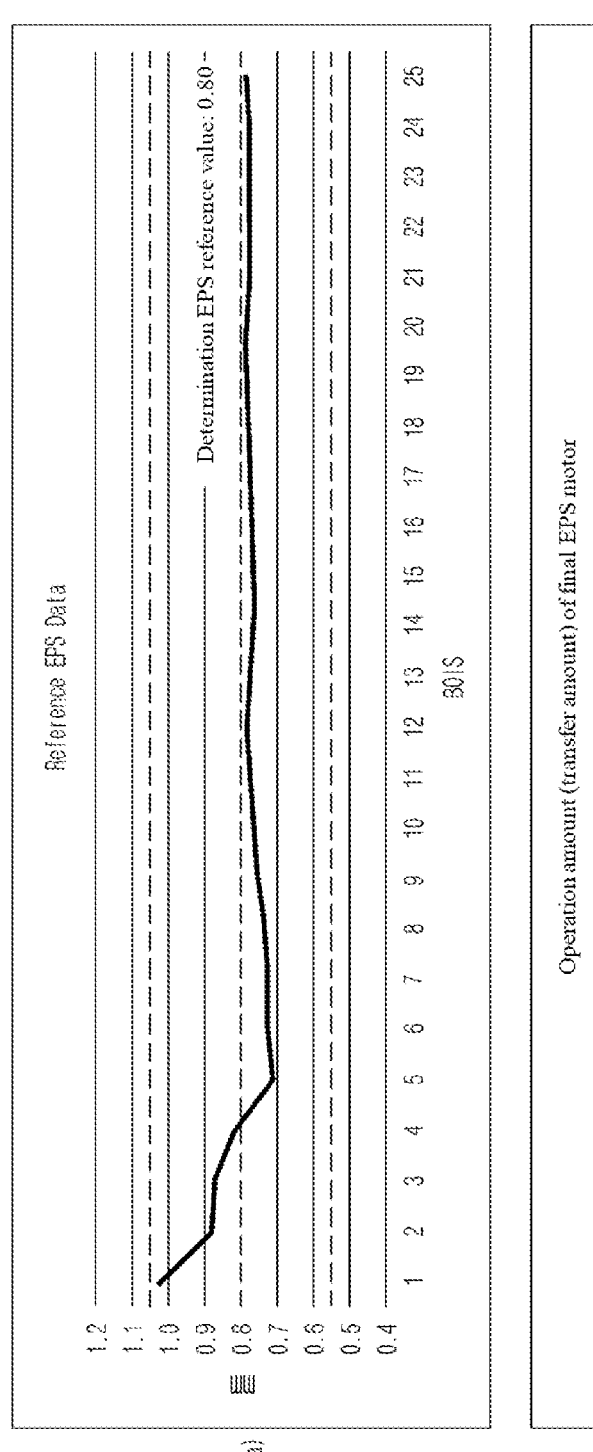
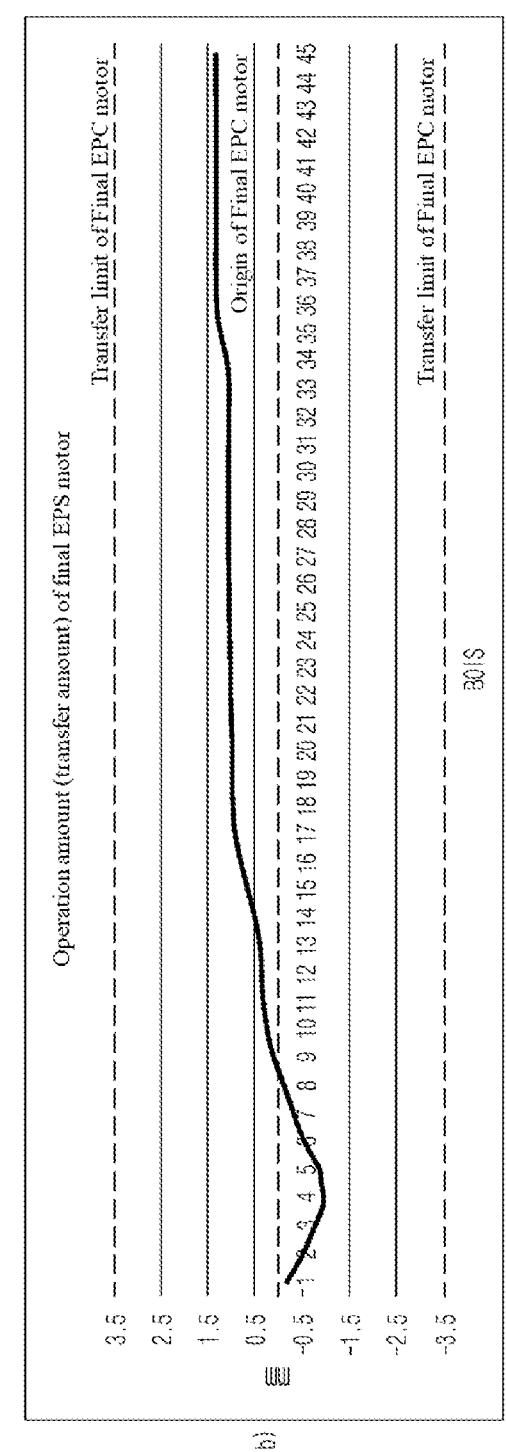
[FIG. 18]

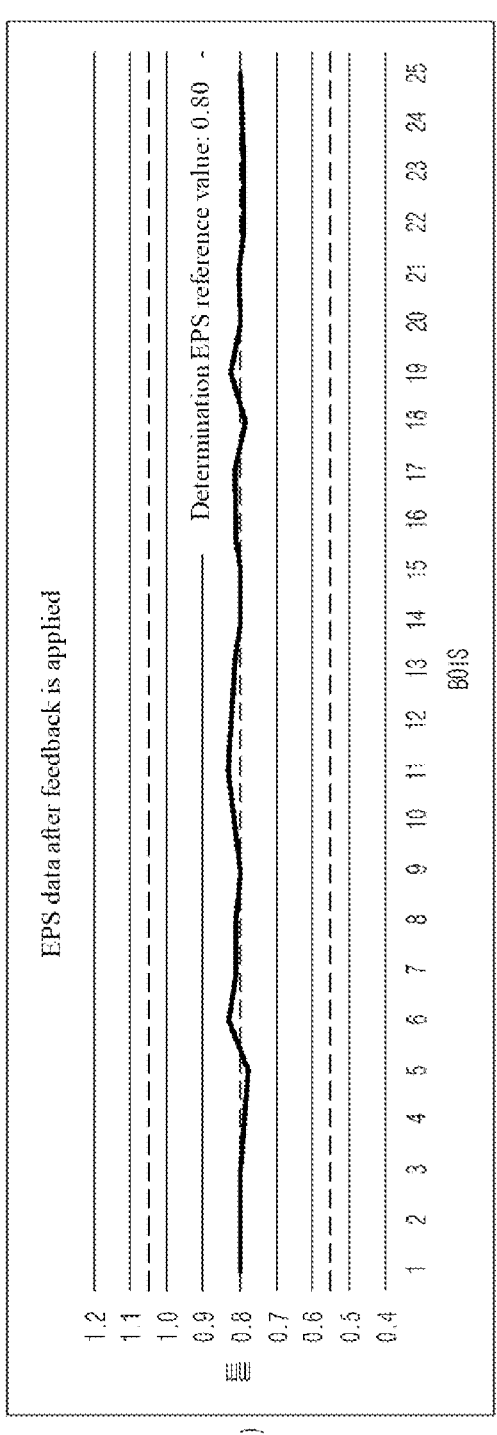
[FIG. 19]

MEANDERING CORRECTION DEVICE FOR ELECTRODE AND MEANDERING CORRECTION METHOD FOR ELECTRODE

TECHNICAL FIELD

The present invention relates to an apparatus and method for correcting meandering when transferring an electrode. More particularly, the present invention relates to an apparatus and method for correcting meandering when transferring an electrode that is transferred to a winding core to form a jelly-roll electrode assembly by being wound around the winding core.

This application claims the benefit of priority based on Korean Patent Application Nos. 10-2021-0026290, filed on Feb. 26, 2021, 10-2021-0067485, filed on May 26, 2021, and 10-2021-0067489, filed on May 26, 2021, and the entire contents of the Korean patent applications are incorporated herein by reference.

BACKGROUND ART

As technical developments and demands in the fields of mobile devices, automobiles, and energy storage devices increase, demand for secondary batteries as energy sources is rapidly increasing, and among the secondary batteries, lithium secondary batteries that have high energy density and discharge voltage have been widely researched, commercialized, and widely used.

In particular, since the lithium secondary battery has an operating voltage of 3.6 V or more, which is three times higher than the operating voltage of a nickel-cadmium battery or a nickel-hydrogen battery that is widely used as a power source of portable electronic devices, and has high energy density per unit weight, the use of the lithium secondary battery is rapidly increasing.

Secondary batteries are also classified according to the structure of an electrode assembly having a structure of a positive electrode, a negative electrode, and a separator interposed between the positive electrode and the negative electrode. Representative examples thereof include a jelly-roll (wound type) electrode assembly having a structure in which long sheet type positive and negative electrodes are wound with a separator interposed therebetween, a stacked type electrode assembly in which a plurality of positive and negative electrodes cut in units of a predetermined size are sequentially stacked with a separator interposed therebetween, and a stacked/folded type electrode assembly having a structure in which unit cells such as bi-cells or full cells, in which positive and negative electrodes of a predetermined unit are stacked with a separator interposed therebetween, are wound.

Among the electrode assemblies, the jelly-roll electrode assembly is easy to manufacture and has a merit of high energy density per weight. In particular, the jelly-roll type electrode assembly having a high energy density may be embedded in a cylindrical metal can to form a cylindrical secondary battery, and such a cylindrical battery is widely applied in fields requiring the application of a high capacity secondary batteries, such as an electric vehicle.

FIG. 1 shows a schematic side view and a plan view illustrating a case in which an electrode is transferred in a roll-to-roll manner and wound around a winding core to form a jelly-roll electrode assembly. As shown in the drawing, an electrode 1 is transferred to an input clamp unit 20 after passing through a line edge position control (EPC) unit 10, and then passes through a final EPC unit 40 and a final roller 50 and is wound around a winding core 60 to form a jelly-roll electrode assembly. Specifically, a separator (not shown) is also transferred and wound around the winding core together with an electrode such as a positive electrode and a negative electrode to form a jelly-roll electrode assembly.

When the electrode 1 is transferred to the winding core 60, ideally, the electrode 1 proceed straight so as to match a set edge reference value. In practice, however, when the electrode is transferred, meandering progress in which the electrode progresses beyond the set edge reference value inevitably occurs. Accordingly, in order to correct the meandering progress, the line EPC unit 10 and the final EPC unit 40 control an edge position of the electrode. The line EPC unit 10 and the final EPC unit 40 respectively include sensors (i.e., a line edge position sensor (EPS) 12 and a determination EPS 42) configured to sense the edge position of the electrode, EPC rollers (i.e., a line EPC roller 11 and a final EPC roller 41) configured to grip and move the electrode, and control units 16 and 46 configured to control the EPC rollers. When the edge position of the electrode sensed by each sensor (the EPS) is different from a set reference edge position, the control units 16 and 46 respectively control the EPC rollers 11 and 41 to adjust the edge position of the electrode so that the edge position matches the reference edge position. For example, the edge position of the electrode is adjusted by gripping and moving the electrode in an axial direction (Y direction) of the EPC rollers (e.g., nip rollers), which are installed to cross a transfer direction (X direction) of the electrode, by the rollers.

FIG. 2 and (b) of FIG. 1 are views illustrating a case in which the edge position of the electrode is adjusted by the above-described EPC rollers. For example, upper and lower roller shafts 11a and 41a of the line EPC roller 11 or the final EPC roller 41 are mechanically connected to motors 15 and 45, respectively, and the controllers 16 and 46 drive the motors 15 and 45 to vertically move the upper and lower roller shafts 11a and 41a, respectively, to the left and right in the transfer direction (X direction) of the electrode, thereby adjusting the edge position of the electrode. In the example illustrated in FIG. 2, the upper and lower roller shafts 11a and 41a are coupled to common brackets 13 and 43, respectively, and the brackets are connected to the motors 15 and 45 by shafts 14 and 44, respectively. When the motors 15 and 45 are driven to rotate, for example, the shafts 14 and 44, which are ball screws, move forward and backward to move the brackets 13 and 43 and the upper and lower roller shafts 11a and 41a connected to the brackets in the Y direction, respectively, so that the electrode engaged with the upper and lower rollers moves in the Y direction. In the illustrated embodiment, the upper and lower roller shafts are connected to the common bracket and motor, respectively, but each of the upper and lower roller shafts may be connected to separate brackets and motors to drive.

However, in the conventional electrode meandering correction apparatus, since the edge position of the electrode is adjusted in each of the line EPC unit 10 and the final EPC unit 40, the two EPC units are controlled by not being linked to each other or the line EPC unit 10 is not properly controlled at least in consideration of the edge position in the final EPC unit 40 that is a mechanism for finally adjusting the edge position before the winding core. As a result, even when feedback control is performed in the final EPC unit 40 to match the edge position of the electrode to the determination EPS edge reference value, which is the reference edge position, the meandering of the electrodes is inevitably occurred in the final EPC unit 40.

FIG. 3 is a schematic view illustrating the conventional electrode meandering correction apparatus and method for adjusting meandering in the line EPC unit and the final EPC unit.

As shown in FIG. 3, the electrode 1 transferred from the line EPC roller 11 to the input clamp roller 21 proceeds toward the winding core 60, passes through the final roller 50, and is wound around the winding core 60 to form a jelly-roll electrode assembly together with a separator. Upon winding around the winding core 60, an input side end of the electrode is cut by a cutter 30, and this cut end is also wound around the winding core 60 to form the jelly-roll electrode assembly.

The conventional electrode meandering correction apparatus includes the line EPC unit 10 in front of the input clamp roller 21, and the edge position of the electrode is adjusted by the line EPC roller 11 of the line EPC unit 10. In addition, the final EPC unit 40 is provided in front of the final roller 50 to finally correct the meandering progress of the electrode.

That is, the edge position of the electrode is controlled by the line EPC unit 10, and a position of the line EPC roller 11 of the line EPC unit 10 is set to have a reference correction value (a line EPC correction value B) corrected to a predetermined roller position by, for example, the controller 16 of the line EPC roller 11 (see (a) of FIG. 3).

Next, the final EPC unit 40 measures the edge position of the electrode 1 using the determination EPS 42 installed at a predetermined position before the winding core 60. The edge position of the electrode 1 is referred to as a determination EPS edge position value. The determination EPS 42 may be a sensor that measures the edge position of the electrode in a non-contact manner, such as a through-beam sensor. When the determination EPS edge position value is different from a set determination EPS edge reference value A, the controller 46, which is a control unit, moves the electrode in a width direction (the Y direction) of the electrode by using the EPC roller 41 provided in a final EPC unit and performs feedback control to match the edge position of the electrode with the determination EPS edge reference value A (see (b) of FIG. 3). At this point, the determination EPS edge reference value A is not zero, and is a set value determined by the determination EPS according to a roll-to-roll process condition of the electrode or the like. Thus, when the process condition is changed, the reference value may also be changed. For example, the determination EPS edge reference value may be 0.8 mm.

The electrode position correction by the EPC roller 41 may be performed at a predetermined position before the determination EPS 42.

However, even in the case in which the meandering progress of the electrode is corrected in the final EPC unit 40, it was confirmed that a plurality of meandering defects are actually generated when the electrode proceeds. In particular, a meandering defect rate of a negative electrode was high. It is identified that one cause for this is that the reference correction value (the line EPC correction value B) of the line EPC roller 11, which is a position before the electrode is input to the input clamp roller 21, does not match the determination EPS edge reference value A of the final EPC unit 40, as shown in FIG. 3. That is, in the roll-to-roll progress of the electrode, a sensor starting point in the determination EPS 42 provided in the final EPC unit 40 does not necessarily match the line EPS 12 provided in the line EPC unit 10. Rather, in the roll-to-roll progress of the electrode, the positions (line) of the electrode at each EPC unit are typically not collinear, and thus the meandering is corrected in each EPC unit. Accordingly, even when the edge position of the electrode is precisely adjusted (corrected) in the line EPC unit 10 before the electrode is input, a mismatch between the determination EPS edge reference value in the final EPC unit 40 and the line EPC correction value of the line EPC unit 10 inevitably occurs. Thus, even when the meandering is corrected later in the final EPC unit 40 as shown in (b) of FIG. 3, there is a limit to the effect of correcting the meandering, and thus, the meandering defect rate increases as described above. In addition, due to the mismatch, in order to solve (correct) the meandering progress of the electrode in the final EPC unit 40 later, the operation amount of the final EPC motor 45 for adjusting a position of the final EPC roller 41 is increased and thus an excessive load is generated in the driving of the motor.

Meanwhile, FIG. 4 is a schematic view for describing the influence of the input clamp unit 20 when the edge position of the electrode is controlled by the final EPC unit 40. For convenience of description, the line EPC unit 10 is not illustrated in FIG. 4.

As shown in the drawing, the electrode 1, which is input to the input clamp roller 21 of the input clamp unit 20 through the line EPC unit 10, proceeds toward the winding core 60, passes through the final roller 50, and is wound around the winding core 60 to form a jelly-roll electrode assembly together with a separator.

As described above, even in the case in which the meandering progress of the electrode is corrected in the final EPC unit 40, a meandering defect unexpectedly occurs when the electrode is input. That is, as shown in (b) of FIG. 4, the input clamp roller 21 is inclined when the electrode is input, and thus the input electrode is also inclined, and accordingly, the position of the electrode measured in the determination EPS 42 is also measured to be meandering. In FIG. 4, "la" indicates the electrode that is biased and meandering.

When such an unexpected meandering defect occurs, the electrode assembly is not wound as designed, thereby adversely affecting the performance of a completed battery. It is determined that the unexpected meandering defect is caused because, for example, the electrode is unstably input by the input clamp roller 21. That is, in the case in which the electrode 1 is input in a direction, in which the meandering occurs, when the electrode is initially input, even when the meandering is corrected later in the final EPC unit 40 as shown in (b) of FIG. 4, there is a limit to the effect of correcting the meandering, and thus, the meandering defect rate increases as described above.

Accordingly, it is desirable to develop a technique capable of improving meandering defects by resolving input instability resulting from the line EPC unit and the input clamp unit.

PRIOR-ART DOCUMENTS

Patent Documents

Korean Patent Registration No. 10-1113424.

DISCLOSURE

Technical Problem

The present invention has been devised to solve the above problems and an object of the present invention is to provide a meandering correction apparatus allowing meandering defects to be improved by feedback-controlling a line edge position control (EPC) unit and an input clamp unit using pieces of data on determination edge position sensor (EPS) edge position values of an electrode, which change over time, when an edge position of the electrode is feedback-controlled in the final EPC unit before the electrode is wound around a winding core.

Another object of the present invention is to provide an electrode meandering correction method of performing feedback control to correct a direction in which an electrode is transferred from a line EPC roller and an input inclination of an input clamp roller through feedback control in which the pieces of data of the determination EPS edge position values are compared with a determination EPS edge reference value.

Technical Solution

An apparatus for correcting meandering of an electrode, which is transferred in a roll-to-roll manner to form a jelly-roll electrode assembly by being wound around a winding core, of the present invention includes a line edge position control (EPC) unit including a line EPC roller configured to transfer the electrode to the winding core side and to adjust an edge position of the electrode, an input clamp unit including an input clamp roller configured to receive the electrode from the line EPC roller and input the electrode to the winding core, and a mechanism configured to adjust an input inclination of the input clamp roller with respect to an electrode transfer direction, a final EPC unit including a determination edge position sensor (EPS) configured to measure the edge position of the electrode transferred from the input clamp roller as a determination EPS edge position value, and a final EPC roller configured to adjust the edge position of the electrode to match a determination EPS edge reference value, and a controller configured to control the line EPC unit, the input clamp unit, and the final EPC unit, wherein the controller feedback-controls the edge position of the electrode so that the determination EPS edge position value matches the determination EPS edge reference value, and feedback-controls each of the line EPC unit and the input clamp unit so that a direction in which the electrode is transferred from the line EPC roller is corrected and the input inclination of the input clamp roller is corrected by comparing pieces of data on the determination EPS edge position values when the determination EPS edge position values change over time to converge to the determination EPS edge reference value by the feedback control, and the determination EPS edge reference value.

As another aspect of the present invention, a method of correcting meandering of an electrode, which is transferred in a roll-to-roll manner to form a jelly-roll electrode assembly by being wound around a winding core, of the present invention includes measuring a determination EPS edge position value by measuring an edge position of the electrode when the electrode, which is sequentially transferred through a line EPC roller of a line EPC unit and an input clamp roller of an input clamp unit, reaches a determination EPS of a final EPC unit, which is disposed before the winding core, by the determination EPS, feedback-controlling, by a controller, the edge position of the electrode so that the determination EPS edge position value matches a predetermined determination EPS edge reference value, obtaining pieces of data on the determination EPS edge position values when the determination EPS edge position values change over time to converge to the determination EPS edge reference value by the feedback control, and feedback-controlling each of the line EPC unit and the input clamp unit so that a direction in which the electrode is transferred from the line EPC roller is corrected and an input inclination of the input clamp roller is corrected by comparing the pieces of data on the determination EPS edge position values and the determination EPS edge reference value.

Advantageous Effects

According to the present invention, a line edge position control (EPC) unit is feedback-controlled to match a determination edge position sensor (EPS) edge reference value in a final EPC unit, and an input inclination of an input clamp roller of an input clamp unit is feedback-controlled, so that, when an electrode is input to a winding core, the electrode is stably input, thereby improving a meandering defect of the electrode.

Accordingly, EPS data at the time of electrode input can be stabilized, and a variation in EPS position data can be reduced over initial stage to later stage, so that a meandering defect and meandering variation due to an unstable electrode input can be improved, thereby stabilizing the quality of an electrode assembly.

Further, a line EPC unit can be feedback-controlled in connection with a final EPC unit, so that an operation amount of a final EPC motor can be reduced, thereby greatly reducing a load applied to motor driving.

BRIEF DESCRIPTION OF THE DRAWINGS

FIG. 1 shows a schematic side view and a plan view illustrating a case in which an electrode is transferred in a roll-to-roll manner and wound around a winding core to form a jelly-roll electrode assembly.

FIG. 2 is a schematic perspective view specifically illustrating a case in which an edge position of the electrode is adjusted by edge position control (EPC) rollers.

FIG. 3 is a schematic view illustrating a conventional electrode meandering correction apparatus and method for adjusting meandering in a line EPC unit and a final EPC unit.

FIG. 4 is a schematic view for describing the influence of an input clamp unit when the edge position of the electrode is controlled by the final EPC unit.

FIG. 5 is a graph illustrating pieces of data on determination edge position sensor (EPS) edge position values, which change over time, when the edge position of the electrode is feedback-controlled in the final EPC unit.

FIG. 6 is a schematic view illustrating an electrode meandering correction apparatus according to the present invention.

FIG. 7 is a schematic perspective view illustrating a case in which an input inclination of an input clamp roller is adjusted by the electrode meandering correction apparatus of the present invention.

FIG. 8 is a flowchart illustrating a sequence of an electrode meandering correction method according to the present invention.

FIG. 9 is a flowchart illustrating a sequence of feedback control for correcting a position of a line EPC roller according to one embodiment of the present invention.

FIG. 10 is a schematic view illustrating a feedback control process of FIG. 9 in connection with a logic value calculation process.

FIG. 11 is a flowchart illustrating a sequence of feedback control for correcting the input inclination of the input clamp roller according to one embodiment of the present invention.

FIG. 12 is a flowchart illustrating a sequence of feedback control for correcting the position of the line EPC roller and the input inclination of the input clamp roller according to another embodiment of the present invention.

FIG. 13 is a schematic view illustrating a feedback control process of (b) in FIG. 12 in connection with a logic value calculation process.

FIG. 14 are graphs illustrating a state in which a determination EPS edge position value and an operation amount of a final EPC motor are stabilized over time when the line EPC roller is corrected by the meandering correction method of the present invention.

FIG. 15 are graphs illustrating a variation in the operation amount of the final EPC motor before and after the line EPC roller is feedback-controlled for a plurality of electrodes by the meandering correction method of the present invention.

FIG. 16 are graphs illustrating a state in which the determination EPS edge position value is stabilized over time when the input inclination of the input clamp roller is corrected by as much as a predetermined correction value by the meandering correction method of the present invention.

FIG. 17 are graphs illustrating a variation of an initial determination EPS edge position value when feedback control is performed by the meandering correction method of the present invention.

FIG. 18 is a set of graphs respectively illustrating a change in data on the determination EPS edge position value over time and a change in an operation amount of the final EPC motor over time before feedback control is performed by the meandering correction method of the present invention.

FIG. 19 is a set of graphs respectively illustrating a change in data on the determination EPS edge position value over time and a change in an operation amount of the final EPC motor over time after feedback control is performed by the meandering correction method of the present invention.

DETAILED DESCRIPTION OF THE PREFERRED EMBODIMENTS

Hereinafter, the present invention will be described in detail. Terms or words used in the present specification and claims should not be restrictively interpreted as ordinary meanings or dictionary-based meanings, but should be interpreted as meanings and concepts consistent with the technical ideas of the present invention on the basis of the principle that an inventor can properly define the concept of a term to describe and explain his or her invention in the best way. Accordingly, embodiments and structures illustrated herein are suggested only by way of example but do not represent all technical concepts of the present invention.

It will be further understood that the terms "comprises," "comprising," "includes," and/or "including," when used herein, specify the presence of stated features, integers, steps, operations, elements, components, and/or groups thereof but do not preclude the presence or addition of one or more other features, integers, steps, operations, elements, components, and/or groups thereof. When it is stated that a portion of a layer, film, area, plate, and the like is "on" another portion, the statement includes the meaning of the portion "being directly on" the other portion in addition to still another portion being interposed therebetween. In contrast, when it is stated that a portion of a layer, film, area, plate, and the like is "below" another portion, the statement includes the meaning of the portion "being directly below" the other portion in addition to still another portion being interposed therebetween. In addition, it may be understood that when it is stated herein that an element is disposed "on" a certain element, the statement may include the case in which the element is disposed not only above the certain element but also below the certain element.

Hereinafter, the present invention will be described in detail.

FIG. 5 is a graph illustrating pieces of data on determination edge position sensor (EPS) edge position values, which change over time, when an edge position of an electrode is feedback-controlled in a final edge position control (EPC) unit 40.

In relation to FIGS. 3 and 4, it has been described that meandering is corrected by measuring an edge position of the electrode 1 by a determination EPS 42 of the final EPC unit 40 and adjusting the edge position of the electrode by a final EPC roller 41 of the final EPC unit 40 so that the edge position matches a determination EPS edge reference value A. However, even when the meandering is corrected in the final EPC unit 40, the edge position of the electrode does not immediately reach the determination EPS edge reference value A, and as the electrode proceeds to the determination EPS 42, edge position values (hereinafter referred to as "determination EPS edge position values") of the electrode, which are continuously measured at the position of the EPS, change over time and gradually converge to the determination EPS edge reference value A as shown in FIG. 5.

FIG. 5 illustrates EPS data that is measured by a predetermined program (program name 'BOIS') for measuring the edge position in the determination EPS 42 and measured a total of 50 times until convergence to the determination EPS edge reference value A. Since the BOIS program shows only odd-numbered or even-numbered data of the EPS data, as shown in FIG. 5, it is illustrated that the program shows that the determination EPS edge position value is measured a total of 25 times until convergence to the determination EPS edge reference value A. Additionally, an X-axis of FIG. 5 indicates the number of measurements or a sequence of measurements, which are measured at predetermined time intervals until convergence to the determination EPS edge reference value A, and a Y-axis indicates the determination EPS edge position value, which is the position of the electrode measured by the determination EPS in each measurement sequence.

As shown in FIG. 5, the determination EPS edge position values are greatly changed (decrease) in a first to third measurement sequence (odd-numbered measurement sequence among the total determination EPS edge position data in the first to fifth measurement sequence), and thereafter, the determination EPS edge position values exhibit a slight undulating flow and gradually converge to the determination EPS edge reference value A (e.g., 0.80 mm). It is determined that, among the pieces of data on the determination EPS edge position values, initial data values greatly vary as described above due to overshooting when the electrode is input. That is, since the input clamp roller 21 of the input clamp unit 20 is tilted when the electrode is input and thus an input inclination of the electrode is erroneously set, or the electrode 1 swings left and right when the electrode is input due to be unexpectedly occurring input instability, meandering occurs. Accordingly, even when the meandering is corrected in the final EPC unit 40, pieces of initial data on the determination EPS edge position values measured at the position of the EPS greatly vary as shown in FIG. 5. Accordingly, when the electrode is allowed to be input to the winding core so that the initial data values do not greatly change, it is possible to reduce a meandering defect caused by overshooting or unexpected input instability as described above. The present inventors paid attention to this point and intended to reduce the meandering defect by selecting data values, which change due to the influence of an inclination of the input clamp roller 21 related to the input of the electrode, from the pieces of data on the determination EPS edge position values and correcting the inclination of the input clamp roller by performing feedback control that compares the selected data values and the determination EPS edge reference value.

Meanwhile, although there is no great change as compared with the initial data, among the determination EPS edge position values, even in an 11th to 25th measurement sequence (odd-numbered data of data in a 21st to 50th measurement sequence among total determination EPS position data in the 1st to 50th measurement sequence), the determination EPS edge position values do not completely converge to the reference value. That is, among the determination EPS edge position values, intermediate and later data values of the measurement sequence are biased to a value smaller than the determination EPS edge reference value (e.g., 0.8 mm). When the position at the determination EPS edge reference value (0.8 mm) is taken as an origin (0), the position of the electrode sensed in the determination EPS is biased in a negative (−) direction, which means that meandering progress occurs. As shown in the 11th to 25th measurement sequence (odd-numbered data of data in a 21st to 50th measurement sequence among total determination EPS position data in the 1st to 50th measurement sequence), of FIG. 5, even after the influence of input is resolved, the determination EPS edge position values do not completely match the determination EPS edge reference value. This is a phenomenon in which the line EPC reference correction value B of the line EPC roller 11 before input of the electrode into the input clamp roller 21 does not initially match the determination EPS edge reference value A. That is, as shown in FIG. 3, the line EPC roller 11 is corrected so that the line EPC unit 10 has the predetermined reference correction value B before input of the electrode into the input clamp roller 21, but since the correction value B does not match the determination EPS edge reference value A, a variation in EPS data having the same trajectory as in FIG. 5 is exhibited. Accordingly, when the intermediate and later data values converge to be closer to the determination EPS edge reference value A, the meandering defect occurring due to the line EPC unit 10 as described above may be reduced. The present inventors paid attention to this point and intended to reduce the meandering defect by selecting data values that change due to the influence of the line EPC correction values of line EPC unit 10 from pieces of data on the determination EPS edge position values and feedback-controlling the line EPC unit 10 to correct a direction in which the electrode is transferred from the line EPC roller 11 by performing feedback control that compares the selected data values and the determination EPS edge reference value A.

FIG. 6 is a schematic view illustrating an electrode meandering correction apparatus 100 according to the present invention.

In the present invention, the same components as those of the conventional meandering correction apparatus of FIGS. 3 and 4 are denoted by the same reference numerals.

The present invention includes a line EPC roller 11 configured to transfer an electrode 1 toward a winding core 60, specifically, toward an input clamp roller 21, and a line EPC unit 10 configured to control an edge position of the electrode by adjusting a position of the line EPC roller with respect to an electrode transfer direction. Specifically, as shown in FIG. 1, the line EPC unit 10 includes a line EPS 12 configured to detect the edge position of the electrode, a line EPC roller 11 configured to adjust the edge position of the electrode, a line EPC motor 15 driven to adjust the position of the line EPC roller, and a controller 16 configured to control the edge position of the electrode by driving the line EPC motor to adjust the position of the line EPC roller on the basis of the edge position of the electrode detected by the line EPS. As described above, an EPC unit as a typical edge position control unit includes an edge position sensor (EPS), a roller (e.g., a nip roller) that is an edge position adjusting member, a driving unit (e.g., a motor), and a controller configured to control these components.

Accordingly, the line EPC unit 10 may control the edge position of the electrode 1 by adjusting a position of the line EPC roller 11. In the present embodiment, the line EPC roller 11 is corrected to a predetermined roller position by the line EPC unit 10 (specifically the controller 16). That is, the line EPC roller 11 corrects meandering in the line EPC, and the position of the line EPC roller 11 is corrected to the reference correction value B in consideration of the electrode input into a final EPC unit 40, which will be described below.

In addition, the meandering correction apparatus 100 according to the present embodiment includes an input clamp unit 20 configured to receive the electrode from the line EPC roller 11 and input the electrode to the winding core side. The input clamp unit 20 includes an input clamp roller 21 configured to receive the electrode from the line EPC roller 11 and input the electrode to the winding core side, and an input inclination adjusting mechanism configured to adjust the inclination (input inclination) of the input clamp roller 21 with respect to the electrode transfer direction. In addition, as shown in FIG. 1, a sensor 22 is also installed in the vicinity of the input clamp roller 21 to check the edge position of the electrode in the input clamp roller 21 or in the vicinity of the input clamp roller 21. The input inclination adjusting mechanism may adjust the inclination of the input clamp roller by adjusting, for example, an inclination of an input clamp roller shaft to be inclined with respect to a direction in which the electrode is input. In order to adjust the inclination, the input inclination adjusting mechanism may include a shaft connected to the input clamp roller shaft and a driving unit (motor).

FIG. 7 is a schematic perspective view illustrating a case in which the input inclination of the input clamp roller 21 is adjusted by the electrode meandering correction apparatus of the present invention. A roller shaft 21a of the input clamp roller is connected to a motor 25 by a motor shaft 24 and a bracket 23. In the illustrated embodiment, upper and lower input clamp roller shafts 21a are connected to the common bracket 23 and the motor 25 to simultaneously adjust upward and downward inclinations of the input clamp roller 21. Each the upper and lower input clamp roller shafts 21a may be driven by being connected to a separate bracket and motor. In FIG. 7, the motor 25, the motor shaft 24, and the bracket 23 form the input inclination adjusting mechanism. As shown in the drawing, when the motor 25 is driven to move the motor shaft 24 (e.g., a ball screw), which is configured to convert rotational motion by the motor or the like into linear motion, forward and backward, the bracket 23 and the input clamp roller shaft 21a connected thereto are adjusted to change the inclination of the input clamp roller shaft 21a with respect to an electrode transfer direction X. In addition to the motor and the motor shaft, a piston may employ a pneumatic cylinder capable of linearly moving from the cylinder by air pressure to adjust the inclination of the roller shaft by the linear movement of the piston by connecting the piston and the roller shaft. Since such a moving mechanism is well known in the mechanical field, a detailed description thereof will be omitted. Importantly, the mechanical or electronic configuration of the inclination adjustment mechanism does not need to be specifically limited as long as the input clamp roller or the roller shaft may be moved to adjust the inclination of the input clamp roller.

Since the present invention is also premised on feedback control in the final EPC unit 40, the final EPC unit 40 is provided. That is, the meandering correction apparatus 100 of the present invention includes the final EPC unit 40 including the determination EPS 42 disposed before the winding core 60 and configured to determine the edge position of the electrode 1 and record the edge position as a determination EPS edge position value and the final EPC roller 41 configured to adjust the edge position of the electrode. The final EPC unit 40 is disposed before the winding core 60 and feedback-controls the edge position of the electrode by adjusting the final EPC roller 41 so that the determination EPS edge position value matches the determination EPS edge reference value A. In order to adjust the edge position of the electrode, the final EPC unit 40 includes a final EPC motor 45 that is driven to adjust the position of the final EPC roller in the same manner as the line EPC unit 10, and a controller 46 configured to adjust the position of the final EPC roller by driving the final EPC motor to control the edge position of the electrode.

Figure 2:
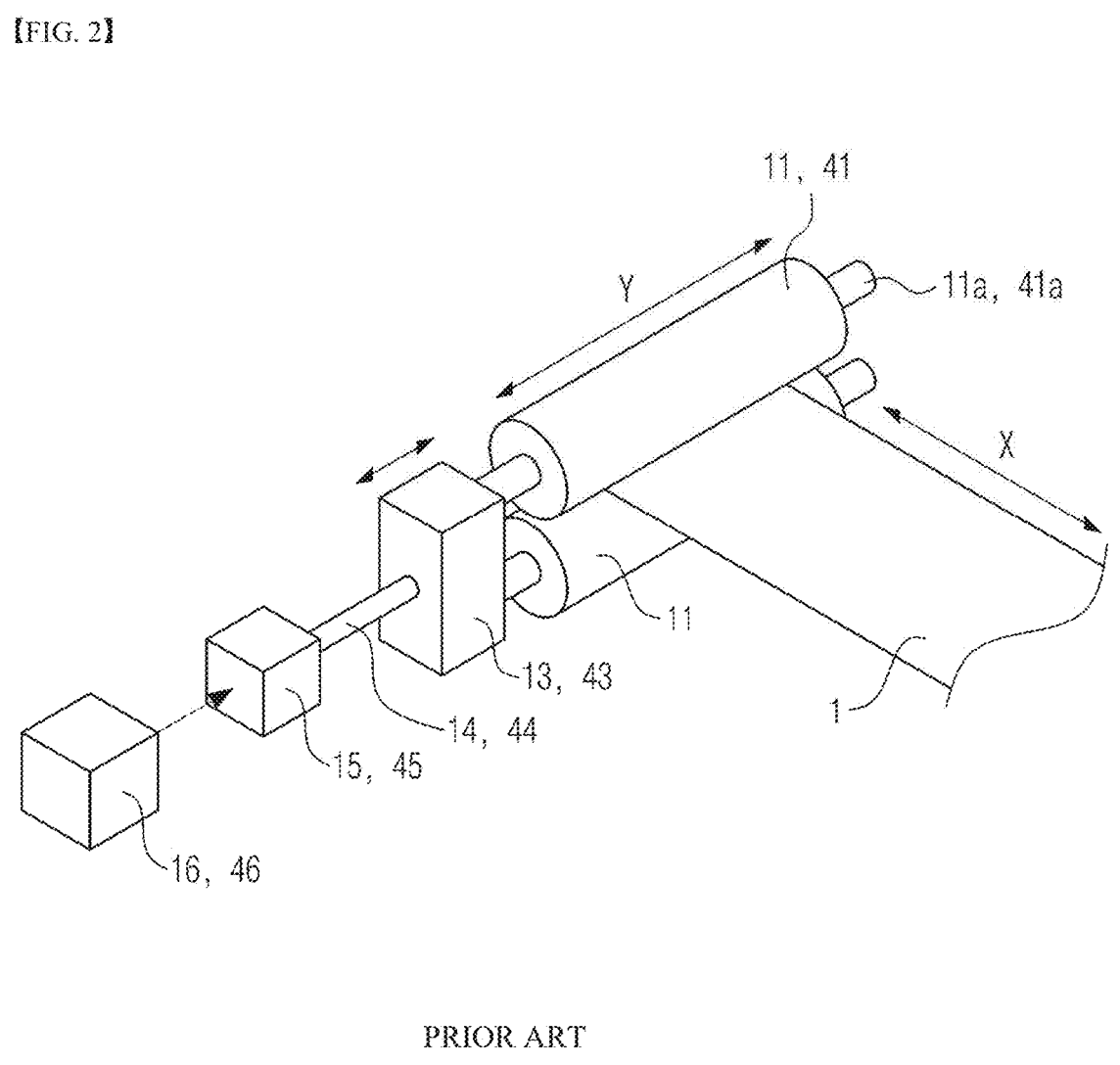

As shown in FIGS. 1 and 2, the adjustment of the position of the line EPC roller 11 by the line EPC motor 15 and the adjustment of the position of the final EPC roller 41 by the final EPC motor 45 may be performed by a conversion mechanism (e.g., a ball screw and a ball nut) configured to convert rotational motion by a driving motor or the like into linear motion. That is, by moving EPC roller shafts, which are connected to the ball screw, in a direction perpendicular to a moving direction of the electrode by the linear motion of the ball screw connected to the motor, the position of each of the EPC roller and the electrode edge may be adjusted. Alternatively, a pneumatic cylinder capable of linearly moving from the cylinder by air pressure may be employed to connect the piston and the roller shaft, thereby adjusting the inclination of the roller shaft by the linear movement of the piston. The mechanical or electronic configuration of the driving mechanism does not need to be specifically limited, as long as the EPC roller shafts may be moved to adjust the edge position of the electrode.

The present invention includes a control unit configured to control the line EPC unit 10, the input inclination adjusting mechanism, and the final EPC unit 40. The control unit feedback-controls the edge position of the electrode so that the determination EPS edge position value matches the determination EPS edge reference value. In addition, each of the line EPC unit 10 and the input clamp unit 20 is feedback-controlled so that the direction in which the electrode is transferred from the line EPC roller 11 is corrected and the input inclination of the input clamp roller is corrected by comparing pieces of data on the determination EPS edge position values when the determination EPS edge position values change over time to converge to the determination EPS edge reference value A by the feedback control, and the determination EPS edge reference value.

The final EPC roller 41 may be installed at a position P (e.g., a position spaced apart from the winding core by 125 mm) in front of an installation position Q (e.g., a position spaced apart from the winding core by 100 mm) of the determination EPS 42 at a predetermined interval. When the position of the electrode 1 measured in the determination EPS 42 is different from the determination EPS edge reference value A, the final EPC unit 40 causes the EPC roller 41 to adjust the position of the electrode 1 at a position in front of the determination EPS 42 at the predetermined interval. Thus, when one electrode is continuously moved to the determination EPS 42, the adjusted position of the electrode 1 may be subsequently measured by the determination EPS 42.

In the embodiment related to FIG. 6, it is illustrated that the controller 16 of the line EPC unit 10 adjusts (feedback-controls) the position of the line EPC roller 11, and the controller 46 of the final EPC unit 40 adjusts (feedback-controls) the position of the final EPC roller 41. However, without each of the controllers 16 and 46, the control unit may directly feedback control the line EPC unit 10 or the line EPC roller 11 and the final EPC unit 40 or the final EPC roller 41. That is, in the present invention, the control unit (in a broad sense) is a concept including both the controllers 16 and 46 and the control unit 70 (a control unit in a narrow sense) included in a box indicated by a dashed-dotted line in FIG. 6. In a case in which there are no controllers 16 and 46, the control unit (in a broad sense) has a form of feedback-controlling the final EPC unit 40, and controlling the line EPC unit 10 and the input clamp unit 20 (strictly, an input clamp adjustment mechanism) in association with the feedback control. In a case in which there are the controllers 16 and 46, the controller 46 that adjusts the final EPC roller 41 to control the edge position of the electrode becomes a first control unit, and the control unit 70 (in a narrow sense) becomes a second control unit that feedback-controls the line EPC unit 10 and the input clamp unit 20 using the pieces of data derived from the feedback control of the first control unit. In addition, the controller 16 of the line EPC unit 10 becomes a third control unit that controls the edge position of the electrode by adjusting the position of the line EPC roller 11 by the feedback control of the second control unit.

Since the meandering correction apparatus 100 of the present invention includes the control unit configured to feedback control the position of the line EPC roller 11 and the inclination of the input clamp roller 21 by performing the feedback control on the final EPC unit 40 and comparing the pieces of data on the determination EPS edge position values, which are obtained by the feedback control, and the determination EPS edge reference value A as described above, a direction in which the electrode is transferred from the line EPC unit 10 and the input clamp unit 20 may be closer to the determination EPS edge reference value A, so that it is possible to improve the input stability of the electrode that is input to the winding core, thereby reducing meandering defects.

Specific control by the control unit included in the electrode meandering correction apparatus 100 of the present invention will be described in more detail below with reference to an electrode meandering correction method according to the present invention.

The present invention also provides a meandering correction method when an electrode, which is wound around the winding core 60 to form a jelly-roll electrode assembly, is transferred in a roll-to-roll manner.

FIG. 8 is a flowchart illustrating a sequence of an electrode meandering correction method according to the present invention.

As shown in the drawing, first in operation (a), an edge position of an electrode when the electrode 1, which is sequentially transferred through a line EPC roller 11 of a line EPC unit 10 and an input clamp roller 21, reaches a determination EPS 42 of a final EPC unit 40 disposed before a winding core 60, is measured by the determination EPS 42 and thus a determination EPS edge position value is measured.

Thereafter, in operation (b), the edge position of the electrode is feedback-controlled by a control unit so that the determination EPS edge position value matches a predetermined determination EPS edge reference value A.

Next, in operation (c), pieces of data on the determination EPS edge position values when the determination EPS edge position values change over time to converge to the determination EPS edge reference value A by the feedback control are obtained.

Next, in operation (d), the line EPC unit 10 is feedback-controlled to correct a direction in which the electrode is transferred from the line EPC roller 11 by comparing the pieces of data on the determination EPS edge position values and the determination EPS edge reference value, and in operation (f), the input clamp unit 20 is feedback-controlled to correct an input inclination of the input clamp roller 21.

The pieces of data on the determination EPS edge position values, which change over time, may be obtained by performing a predetermined number of measurements at predetermined time intervals until the pieces of data converge to the determination EPS edge reference value A. As shown in FIG. 5, the pieces of data on the determination EPS edge position values may be obtained by performing, for example, 50 measurements. As shown in FIG. 5, among the pieces of data on the position values, data values, which are changed due to a direction in which the electrode is transferred from line EPC unit 10, are data values that vary in intermediate and later measurements among the pieces of data on the determination EPS edge position values. For example, the intermediate and later data values may be data values measured at 21st to 50th measurements by the determination EPS 42 when the determination EPS edge reference value is measured 50 times until the data values converge to the determination EPS edge reference value A. However, as described above, when only odd-numbered data transmitted by a predetermined program (program name 'BOIS') for measuring the edge position in the determination EPS 42 is referenced, the intermediate and later data values may be data values of an 11th to 25th measurement sequence of the determination EPS.

Further, among the pieces of data on the determination EPS edge position values, data values that are changed due to the influence of the inclination of the input clamp roller are selected, and feedback control in which the data values are compared with the determination EPS edge reference value is performed. As shown in FIG. 5, among the pieces of data on the position values, the data values, which are changed due to the influence of the inclination of the input clamp roller, are data values that initially vary among the pieces of data on the determination EPS edge position values. For example, the initial data values may be data values measured at 1st to 50th measurements by the determination EPS when the determination EPS edge reference value is measured 50 times until the data values converge to the determination EPS edge reference value A.

In the meandering correction method of the present invention, the line EPC roller 11 is feedback-controlled by comparing the intermediate and later data values and the determination EPS edge reference value A, and the input clamp roller is feedback-controlled by comparing the initial data values and the determination EPS edge reference value, and thus a specific embodiment of the feedback control will be described below.

MODES OF THE INVENTION

First Embodiment

FIG. 9 is a flowchart illustrating a sequence of feedback control for correcting a position of the line EPC roller 11 according to one embodiment of the present invention, and FIG. 10 is a schematic view illustrating a feedback control process of FIG. 9 in connection with a logic value calculation process.

First, in operation (d1), among the pieces of data on the determination EPS edge position values, the determination EPS edge position value of each of the intermediate and later measurements is compared with the determination EPS edge reference value A. A value obtained by averaging differences between the pieces of data on the determination EPS edge position values at the intermediate and later measurements and the determination EPS edge reference value is defined as a logic value for line EPC feedback control. The average value of the difference values may more effectively reflect the influence of the line EPC unit 10 than a difference value between a single value among the data values of the intermediate and later measurements and the determination EPS edge reference value. Accordingly, for example, difference values between the determination EPS edge position values in the 21st to 50th measurement sequence of FIG. 5 (at the intermediate and later measurements) (in the list to 25th measurement sequences in the BOIS program) and the determination EPS edge reference value A are calculated, and a value obtained by averaging these difference values is defined as a predetermined logic value $Y_{logic}$ for the feedback control, which is expressed as Equation 1 below. A large logic value means that the input of the electrode from the line EPC unit 10 is greatly unstable, and thus, the position of the line EPC roller 11 of the line EPC unit 10 may be corrected in response to a magnitude of the logic value.

$$Y_{logic} = [((\text{determination EPS edge position value at 21st measurement-determination EPS edge reference value}) + \ldots + (\text{determination EPS edge position value at 50th measurement-determination EPS edge reference value}))/30] \qquad \text{Equation 1.}$$

In the present embodiment, in addition to correcting the line EPC roller 11 using the logic value when a single electrode is input, the meandering of the electrode is corrected by using an average value of logic values when a plurality of electrodes are input, so that meandering correction reliability is further improved. That is, in operation (d2), when an electrode is input a predetermined number of times, an average logic value $Y_{logic}$ (see Equation 2 below) obtained by averaging the logic values of each electrode is calculated.

$$\text{Average } Y_{logic} = Y_1 + Y_2 + \ldots + Y_{n-1} + Y_n/n \text{ when electrode is input } n \text{ times} \qquad \text{Equation 2.}$$

Since the average logic value is a value obtained by averaging the logic values when the plurality of electrodes are input, the influence due to the line EPC unit 10 is further indicated. Accordingly, when the position of the line EPC roller 11 is corrected for every predetermined number of inputs of the electrodes in response to a magnitude of the average logic value, instability caused by inputting the electrode from the line EPC unit 10 may be more effectively resolved. In the present embodiment, the average $Y_{logic}$ when the electrode is input, for example, five times, is obtained, and the average $Y_{logic}$ is calculated as a line EPC roller correction value.

In operation (d3), feedback control is performed to correct the position of the line EPC roller 11 by as much as the calculated line EPC roller correction value. That is, for example, every five electrode inputs, the calculated average $Y_{logic}$ is calculated as the line EPC roller correction value, and the feedback control may be performed so that the position of the line EPC roller 11 is corrected by as much as the correction value every five electrode inputs.

As shown in FIG. 10, a correction value 1 is obtained by averaging logic values $Y_1$, $Y_2$, $Y_3$, $Y_4$, and $Y_5$ calculated for each input of respective electrodes forming five jelly-roll (J/R) electrode assemblies, and the position of the line EPC roller 11 is corrected by as much as the correction value 1. Specifically, when there is a reference correction value corrected to a predetermined roller position by the line EPC unit 10, the position of the line EPC roller 11 corrected to the reference correction value is corrected by as much as the correction value 1.

Thereafter, a correction value 2 is obtained by averaging logic values $Y_6$, $Y_7$, $Y_8$, $Y_9$, and $Y_{10}$ calculated for each input of respective electrodes forming five jelly-roll electrode assemblies, and the position of the line EPC roller 11 is corrected again by as much as the correction value 2.

Subsequently, every five electrode inputs, the correction value is continuously obtained by obtaining the average logic value as described above, and feedback control that continuously corrects the position of the line EPC roller 11 by as much as the obtained correction value is performed (see operation (e) of FIG. 9).

As in operation (d3), a period in which the line EPC roller 11 is corrected may be once every predetermined number of electrode inputs. That is, the correction period may be given as a default value selected for every appropriate predetermined number of electrode inputs. For example, as in the present embodiment, the correction may be performed once every five electrode inputs.

Meanwhile, the correction value (average logic value) may have a positive (+) or negative (−) sign according to the calculation. When the sign of the correction value is positive (+), since it means that the reference correction value of the line EPC roller 11 is biased in a positive direction with respect to the determination EPS edge reference value A, the line EPC roller 11 is feedback-controlled so that as much as the correction value is subtracted from the reference correction value of the line EPC roller 11. For example, when the correction value is 0.05, the reference correction value of the line EPC is subtracted by −0.05 mm.

Conversely, when the sign of the correction value is negative (−), since it means that the reference correction value of the line EPC roller 11 is biased in a negative direction with respect to the determination EPS edge reference value A, the line EPC roller 11 is feedback-controlled so that as much as the correction value is added to the reference correction value of the line EPC roller 11. For example, when the correction value is −0.05, as much as 0.05 mm is added to the reference correction value of the line EPC roller 11.

Thereafter, in operation (e), by repeating operations (d1) to (d3), feedback correction is performed in which the reference correction value of the line EPC roller 11 is sequentially changed for each of the plurality of electrodes introduced by the line EPC unit 10. By repeating such feedback correction and ultimately allowing the position of the line EPC roller 11 to be closer to the determination EPS edge reference value A, the direction in which the electrode is transferred from the line EPC roller 11 may be closer to the data on the determination edge position of the determination EPS 42.

Meanwhile, the line EPC motor 15 configured to adjust the position of the line EPC roller 11 has a smaller driving force as compared with the final EPC motor 45, and a variation of the determination EPS edge position value due to the influence of the position of the line EPC roller 11 is not so large as compared with the influence of the input clamp roller 21 when the electrode is input (see FIG. 5)). In consideration of this point, an upper limit of the correction value of the line EPC roller 11, which is the average logic value, may be limited. For example, a movement width of the final EPC roller 41 by the final EPC motor 45 in a left-and-right direction (the Y direction) with respect to the electrode transfer direction may be +/−3.5 mm. On the other hand, a range, which may be controlled once using the line EPC roller 11 by the line EPC motor 15, of a movement width in the left-and-right direction (the Y direction) is limited to +/−0.05 mm. Accordingly, even when the correction value exceeds 0.05 as an absolute value, a maximum position adjustment width may be limited to +/−0.05 mm. When the position of the line EPC roller 11 exceeds the upper limit and thus is controlled to be corrected, an excessive load may be applied to the line EPC motor 15, and the variation of the determination EPS edge position value measured by the final EPC unit 40 may be increased.

FIG. 11 is a flowchart illustrating a sequence of feedback control for correcting the inclination of the input clamp roller according to one embodiment of the present invention.

First, in operation (f1), among the pieces of data on the determination EPS edge position values, an average value of the initial data values is compared with the determination EPS edge reference value. The influence of input instability may be reflected more effectively when the average value of the initial data values is compared with the determination EPS edge reference value than when a single value of the initial data value is compared with the determination EPS edge reference value. Thus, for example, a difference value between the average value of the (initial) determination EPS edge position values in a 1st to 5th measurement sequence (1st to 3rd measurement sequence in the BIOS program) in FIG. 5 and the determination EPS edge reference value is calculated. This difference value is defined as a predetermined logic value $X_{logic}$ for feedback control and is expressed by Equation 3 below. A large logic value means that instability when the electrode is input is large, and thus the inclination of the input clamp roller 21 may be corrected in response to a magnitude of the logic value.

$$X_{logic}=[(\text{average value of determination EPS edge} \\ \text{position values in 1st to 5th measurement} \\ \text{sequence})-\text{determination EPS edge reference} \\ \text{value}] \qquad \text{Equation 3.}$$

In the present embodiment, in addition to correcting the inclination of the input clamp roller 21 using the logic value when a single electrode is input, the meandering of the electrode is corrected by using an average value of logic values when a plurality of electrodes are input, so that meandering correction reliability is further improved. That is, in operation (f2), when an electrode is input a predetermined number of times, an average logic value $X_{logic}$ (see Equation 4 below) obtained by averaging the logic values of each electrode is calculated. Since the average logic value is a value obtained by averaging logic values when a plurality of electrodes are input, instability when the electrode is input is further indicated. Accordingly, when the inclination of the input clamp roller 21 is corrected for every predetermined number of electrode inputs in response to a magnitude of the average logic value, the instability at the time of electrode input may be more effectively resolved.

$$\text{Average } X_{logic} = X_1 + X_2 + \ldots + X_{n-1} + X_n / n \text{ when electrode is input } n \text{ times} \qquad \text{Equation 4.}$$

Further, the correction may also be performed by changing the correction period according to the magnitude of the average logic value. When the average logic value is large when the electrodes are input a predetermined number of times, which means that the instability when the electrodes are input is large. Accordingly, when the average logic value is large, the correction may be performed quickly by reducing the correction period, and when the average logic value is small, the correction period may be increased. In FIG. 4, the determination EPS edge position values exhibit negative (−) values when the determination EPS edge position values are biased to the left with respect to the determination EPS edge reference value, and exhibit positive (+) values when the determination EPS edge position values are biased to the right. Accordingly, the sign of the average logic value may also be expressed as negative or positive, and the correction may be performed by changing the correction period according to a magnitude of an absolute value of the average logic value.

An example of a case in which the correction is performed by changing the correction period according to the magnitude of the absolute value of the average logic value is illustrated as follows.

<Average $X_{logic}$ when Electrodes are Input Five Times>

$$\text{Average } X_{logic} = X_1 + X_2 + X_3 + X_4 + X_5 / 5.$$

$|\text{Average } X_{logic}| \geq 0.200 \rightarrow$ input inclination is corrected every five electrode inputs.

<Average $X_{logic}$ when Electrodes are Input 10 Times>

$$\text{Average } X_{logic} = X_1 + X_2 + \ldots + X_9 + X_{10} / 10.$$

$0.100 \leq |\text{average } X_{logic}| < 0.200 \rightarrow$ input inclination is corrected every 10 electrode inputs.

<Average $X_{logic}$ when Electrodes are Input 15 Times>

$$\text{Average } X_{logic} = X_1 + X_2 + \ldots + X_{14} + X_{15} / 15.$$

$0.050 \leq |\text{average } X_{logic}| < 0.100 \rightarrow$ input inclination is corrected every 15 electrode inputs.

<Average $X_{logic}$ when Electrodes are Input 20 Times>

$$\text{Average } X_{logic} = X_1 + X_2 + \ldots + X_{19} + X_{20} / 20.$$

$0.025 \leq |\text{average } X_{logic}| < 0.050 \rightarrow$ input inclination is corrected every 20 electrode inputs.

<Average $X_{logic}$ when Electrodes are Input 25 Times>

$$\text{Average } X_{logic} = X_1 + X_2 + \ldots + X_{24} + X_{25} / 25.$$

$|\text{average } X_{logic}| < 0.025 \rightarrow$ input inclination is not corrected.

When the average logic value is calculated in operation (f2), the inclination of the input clamp roller 21 may be corrected by as much as a predetermined correction value by changing the correction period according to the magnitude of the average logic value (operation (f3)). The correction value may be given as a default value as a numerical unit capable of performing the correction according to the magnitude of the average logic value within a limit capable of adjusting the inclination of the input clamp roller 21. For example, the inclination of the input clamp roller 21 may be corrected by as much as a correction value of 0.01. When the correction value is large, it means that a size of the inclination corrected by one-time correction is large, and when the correction value is small, it means that the size of the inclination corrected by one-time correction is small. When the correction value is small, the size of the inclination of the roller, which is corrected once, is small, but the inclination of the input clamp roller 21 may be more precisely adjusted.

Meanwhile, since the average logic value has a sign, the correction value of the inclination of the input clamp roller 21 is applied to have a sign opposite to the sign. For example, when the sign of the average logic value is positive, the inclination of the input clamp roller is corrected by subtracting as much as a predetermined correction value (e.g., 0.001), when the sign of the average logic value is negative, the inclination of the input clamp roller is corrected by adding as much as a predetermined correction value (e.g., 0.001), thereby reducing the magnitude of the average logic value.

Thereafter, in operation (g), by repeating operations (f1) to (f3), feedback correction is performed in which the average logic values of the plurality of electrodes input by the input clamp roller 21 are sequentially reduced. When such feedback correction is repeated, and the magnitude of the average logic value ultimately becomes smaller than a set predetermined value, the instability upon electrode input is completely resolved and it enters a stabilization period, so that the inclination of the input clamp roller 21 does not need to be further corrected. That is, when the absolute value of the average $X_{logic}$ is less than 0.025, the input inclination does not need to be corrected since it enters the stabilization period. When the input inclination is corrected in this period, the input instability is rather increased.

Second Embodiment

FIG. 12 is a flowchart illustrating a sequence of feedback control for correcting the position of the line EPC roller 11 and the input inclination of the input clamp roller 21 according to another embodiment of the present invention.

The present embodiment is different from the first embodiment in that a definition of a logic value $Y_{logic}$ is different.

First, the present embodiment is the same as the first embodiment in that, in operation (d1)′ of (a) of FIG. 12, among the pieces of data on the determination EPS edge position values, the determination EPS edge position value of each of the intermediate and later measurements is compared with the determination EPS edge reference value A. However, in the second embodiment, the difference is that a value obtained by multiplying a value, which is obtained by averaging the difference values between the pieces of data on the determination EPS edge position values in the intermediate and later measurement sequences and the determination EPS edge reference value, by a predetermined correction factor is defined as a logic value for performing line EPC feedback control.

An electrode is continuously transferred from an electrode production and winding line, and transferred to a winding core and wound around the winding core to form a jelly-roll electrode assembly. In this process, hunting or overshooting of unknown causes may occur. Alternatively, since a sensor such as an EPS is contaminated or, in extreme cases, the electrode is separated from the winding core, an error may occur in measured values of a determination EPS. When a measurement error of the determination EPS due to such an unexpected variable is not considered, in some cases, the measurement error that unavoidably generated during the feedback control is not reflected, and thus an influence of input instability may not be accurately evaluated. Accordingly, in the second embodiment, a value obtained by multiplying a predetermined correction factor, which reflects the measurement error in the determination EPS 42 due to such an unexpected variable, is used as the logic value. Such a correction factor may be obtained by applying a predetermined quadratic function model having the correction factor (hereinafter referred to as "$P_{logic}$") as a dependent variable and an average value of difference values between, for example, pieces of data on determination EPS edge position values and a determination EPS edge reference value A as an independent variable.

Table 1 below shows an example of the correction factor according to the average value of the difference values calculated according to the predetermined quadratic function model.

Thereafter, in operation (d2), when a predetermined number of electrodes are input, an average logic value $Y_{logic}$ obtained by averaging logic values of each electrode is calculated on the basis of Equation 2 above.

Even in the present embodiment, the average $Y_{logic}$ when the electrodes are input, for example, five times may be obtained, and the average $Y_{logic}$ may be calculated as a line EPC roller correction value.

In operation (d3), feedback control is performed to correct the position of the line EPC roller 11 by as much as the calculated line EPC roller correction value.

The feedback control is performed to correct the position of the line EPC roller 11 by adding or subtracting as much as the correction value to or from the reference correction value of the line EPC roller 11 according to the sign of the correction value (average logic value).

Thereafter, in operation (e), by repeating operations (d1)' to (d3), feedback correction is performed in which the

TABLE 1

| Average value | Correction factor (%) | Average value | Correction factor (%) | Average value | Correction factor (%) |
|---|---|---|---|---|---|
| 0.03 | 23.6 | 0.36 | 31.8 | 0.69 | 43.6 |
| 0.04 | 23.8 | 0.37 | 32.1 | 0.7 | 44.0 |
| 0.05 | 24.0 | 0.38 | 32.4 | 0.71 | 44.4 |
| 0.06 | 24.2 | 0.39 | 32.7 | 0.72 | 44.8 |
| 0.07 | 24.4 | 0.4 | 33.0 | 0.73 | 45.3 |
| 0.08 | 24.6 | 0.41 | 33.3 | 0.74 | 45.7 |
| 0.09 | 24.8 | 0.42 | 33.6 | 0.75 | 46.1 |
| 0.1 | 25.0 | 0.43 | 34.0 | 0.76 | 46.6 |
| 0.11 | 25.2 | 0.44 | 34.3 | 0.77 | 47.0 |
| 0.12 | 25.4 | 0.45 | 34.6 | 0.78 | 47.4 |
| 0.13 | 25.7 | 0.46 | 35.0 | 0.79 | 47.9 |
| 0.14 | 25.9 | 0.47 | 35.3 | 0.8 | 48.3 |
| 0.15 | 26.1 | 0.48 | 35.6 | 0.81 | 48.8 |
| 0.16 | 26.4 | 0.49 | 36.0 | 0.82 | 49.2 |
| 0.17 | 26.6 | 0.5 | 36.3 | 0.83 | 49.7 |
| 0.18 | 26.8 | 0.51 | 36.7 | 0.84 | 50.2 |
| 0.19 | 27.1 | 0.52 | 37.0 | 0.85 | 50.6 |
| 0.2 | 27.3 | 0.53 | 37.4 | 0.86 | 51.1 |
| 0.21 | 27.6 | 0.54 | 37.8 | 0.87 | 51.6 |
| 0.22 | 27.8 | 0.55 | 38.1 | 0.88 | 52.0 |
| 0.23 | 28.1 | 0.56 | 38.5 | 0.89 | 52.5 |
| 0.24 | 28.4 | 0.57 | 38.9 | 0.9 | 53.0 |
| 0.25 | 28.6 | 0.58 | 39.2 | 0.91 | 53.5 |
| 0.26 | 28.9 | 0.59 | 39.6 | 0.92 | 54.0 |
| 0.27 | 29.2 | 0.6 | 40.0 | 0.93 | 54.5 |
| 0.28 | 29.4 | 0.61 | 40.4 | 0.94 | 55.0 |
| 0.29 | 29.7 | 0.62 | 40.8 | 0.95 | 55.5 |
| 0.3 | 30.0 | 0.63 | 41.2 | 0.96 | 56.0 |
| 0.31 | 30.3 | 0.64 | 41.6 | 0.97 | 56.5 |
| 0.32 | 30.6 | 0.65 | 42.0 | 0.98 | 57.0 |
| 0.33 | 30.9 | 0.66 | 42.4 | 0.99 | 57.5 |
| 0.34 | 31.2 | 0.67 | 42.8 | 1 | 58 |
| 0.35 | 31.5 | 0.68 | 43.2 | | |

As shown in Table 1, the correction factor is determined differently according to a magnitude of the average value of the difference values between the pieces of data on the determination EPS edge position values and the determination EPS edge reference value. According to the predetermined quadratic function model applied to Table 1, the correction factor tends to increase as the average value increases.

According to the present embodiment, $Y_{logic}$ is calculated as in Equation 5 below.

$$Y_{logic}[((\text{determination EPS edge position value at 21st measurement-determination EPS edge reference value}) + \ldots + (\text{determination EPS edge position value at 50th measurement-determination EPS edge reference value}))/30] \times P_{logic} \qquad \text{Equation 5.}$$

reference correction value of the line EPC roller 11 is sequentially changed for each of a plurality of electrodes introduced by the line EPC unit 10. By repeating such feedback correction and ultimately allowing the position of the line EPC roller 11 to be closer to the determination EPS edge reference value, the direction in which the electrode is transferred from the line EPC roller 11 may be closer to the data on the edge position of the electrode at the determination EPS 42.

In FIG. 12, (b) is a flowchart illustrating a sequence of feedback control for correcting the inclination of the input clamp roller 21 according to another embodiment of the present invention.

The present embodiment is different from the first embodiment in that a definition of a logic value $X_{logic}$ is different.

In the present embodiment, in order to obtain the logic value, a value obtained by multiplying the logic value of the first embodiment (the difference value between the average value of the initial data values and the determination EPS edge reference value) by a predetermined correction factor reflecting the measurement error of the determination EPS due to the unexpected variable is defined as the logic value. An electrode is continuously transferred from an electrode production and winding line, and transferred to a winding core and wound around the winding core to form a jelly-roll electrode assembly. In this process, hunting or overshooting of unknown causes may occur. Alternatively, since a sensor such as an EPS is contaminated or, in extreme cases, the electrode is separated from the winding core, an error may occur in measured values of a determination EPS. When a measurement error of the determination EPS due to such an unexpected variable is not considered, in some cases, the measurement error that is unavoidably generated during the feedback control is not reflected, and thus an influence of input instability may not be accurately evaluated. Accordingly, in the second embodiment, a value obtained by multiplying a predetermined correction factor, in which reflects the measurement error in the determination EPS due to such an unexpected variable, is used as the logic value. For example, when the correction factor is 1, this may indicate a case of normal line operation in which an unexpected variable may occur. On the other hand, when the correction factor is less than 1, for example, 0.6, this reflects a stable operation situation in which the unexpected variable does not occur. When the logic value or the average logic value is less than a predetermined value even in the situation of stable operation, it may be determined that the input stability has entered a stable period, and in this case, the input inclination does not need to be corrected any more. As described above, the correction factor for defining the logic value related to the control of the input clamp roller 21 is calculated in a different manner from the correction factor for defining the logic value related to the control of the line EPC roller 11.

From the above description, when the correction factor for defining the logic value related to the control of the input clamp roller is assumed to be $P_{logic}$, the logic value $X_{logic}$ of the present embodiment may be defined as Equation 6 below in operation Mr.

$$X_{logic}=[\text{(average value of determination EPS edge position values in 1st to 5th measurement sequence)}-\text{determination EPS edge reference value}]\times P_{logic} \qquad \text{Equation 6.}$$

Thereafter, in operation (f2), when electrodes are input a predetermined number of times, an average logic value $X_{logic}$ (see Equation 7 below) obtained by averaging a logic value of each electrode is calculated.

$$\text{Average } X_{logic} \text{ when electrodes are input } n \text{ times}=\{X_1+X_2+\ldots+X_{n-1}+X_n/n\}\times P_{logic} \qquad \text{Equation 7.}$$

Further, in operation (f3), the correction may also be performed by changing the correction period according to a magnitude of the average logic value. An example of a case in which the correction is performed for every predetermined number of electrode inputs by changing the correction period according to a magnitude of an absolute value of the average logic value is illustrated as follows.

<Average $X_{logic}$ when Electrodes are Input Five Times>

$$\text{Average } X_{logic}=\{X_1+X_2+X_3+X_4+X_5/5\}\times P_{logic}.$$

$$P_{logic}=1.0.$$

|Average $X_{logic}$|≥0.200→input inclination is corrected every five electrode inputs.

<Average $X_{logic}$ when Electrodes are Input 10 Times>

$$\text{Average } X_{logic}=\{X_1+X_2+\ldots+X_9+X_{10}/10\}\times P_{logic}.$$

$$P_{logic}=1.0.$$

0.100≤|average $X_{logic}$|<0.200→input inclination is corrected every 10 electrode inputs.

<Average $X_{logic}$ when Electrodes are Input 15 Times>

$$\text{Average } X_{logic}=\{X_1+X_2+\ldots+X_{14}+X_{15}/15\}\times P_{logic}.$$

$$P_{logic}=1.0.$$

0.050≤|average $X_{logic}$|<0.100→input inclination is corrected every 15 electrode inputs.

<Average $X_{logic}$ when Electrodes are Input 20 Times>

$$\text{Average } X_{logic}=\{X_1+X_2+\ldots+X_{19}+X_{20}/20\}\times P_{logic}.$$

$$P_{logic}=1.0.$$

0.025≤|average $X_{logic}$|<0.050→input inclination is corrected every 20 electrode inputs.

<Average $X_{logic}$ when Electrodes are Input 25 Times>

$$\text{Average } X_{logic}=\{X_1+X_2+\ldots+X_{24}+X_{25}/25\}\times P_{logic}.$$

$$P_{logic}=0.6.$$

|average $X_{logic}$|<0.025→input inclination is not corrected.

When the average logic value is calculated in operation (f2), the inclination of the input clamp roller 21 may be corrected by as much as a predetermined correction value by changing the correction period according to the magnitude of the average logic value (operation (f3)). For example, the inclination of the input clamp roller 21 may be corrected by as much as a correction value of 0.01. When the sign of the average logic value is positive, the inclination of the input clamp roller is corrected by subtracting as much as a predetermined correction value (e.g., 0.001), when the sign of the average logic value is negative, the inclination of the input clamp roller is corrected by adding as much as a predetermined correction value (e.g., 0.001), thereby reducing the magnitude of the average logic value.

Thereafter, in operation (g), by repeating operations (f1)' to (f3), feedback correction is performed in which the average logic values of the plurality of electrodes input by the input clamp roller 21 are sequentially reduced. When such feedback correction is repeated, and the magnitude of the average logic value ultimately becomes smaller than a set predetermined value, the instability when the electrode is input is completely resolved and it enters a stabilization period, so that the inclination of the input clamp roller does not need to be further corrected. That is, when the absolute value of the average $X_{logic}$ is less than 0.025, the input inclination does not need to be corrected since it enters the stabilization period. When the input inclination is corrected in this period, the input instability is rather increased. In the case in which the correction factor due to the unexpected variable is not considered as in the first embodiment, in some cases, the input inclination is mechanically corrected according to the average logic value even when the operation is stable due to a small number of unexpected variables. In this case, in some cases, the input instability is rather increased due to the correction of the input inclination. Accordingly, as indicated above, when the absolute value of the average logic values, which is obtained by multiplying the average logic value when the electrodes are input 25 times by a correction factor of 0.6, is less than 0.025, it is determined that it has already entered the stabilization period, and thus the correction should not be performed. Even in this case, when the average logic value is calculated by multiplying a correction factor of 1, in some cases, the correction of the input inclination may be meaninglessly repeated. Accordingly, it is a feature of the present embodiment that the input stability may be reliably improved by setting a consistent reference (a correction factor of 0.6) for the stabilization period without an unexpected variable and establishing a final goal of the feedback control.

FIG. 13 is a schematic view more clearly illustrating a process of feedback-controlling the input clamp roller of the second embodiment of (b) of FIG. 12 in connection to a logic value calculation operation.

As shown in FIG. 13, average logic values are obtained from initial EPS data of electrodes J/R1, J/R2, . . . J/R24, and J/R25 for manufacturing, for example, 25 jelly-roll (J/R) electrode assemblies. In addition, these average logic values are multiplied by a predetermined correction factor (e.g., 1.0 or 0.6).

Correction is performed by changing a correction period ((for example, one correction is performed every 5, 10, 15, and 20 electrode inputs) and adjusting the input inclination by adding or subtracting as much as a predetermined correction value (e.g., 0.01) according to a magnitude of an absolute value of the average logic values to which the correction factor is applied, When the magnitude of the average logic value multiplied by the correction factor is less than 0.025 according to a first calculation of the logic value, the purpose of feedback control is achieved so that the input inclination does not need to be corrected. Otherwise, the process is repeated for a secondary calculation of the logic value.

FIG. 14 are graphs illustrating a state in which the determination EPS edge position value and the operation amount of the final EPC motor are stabilized over time when the line EPC roller is corrected by the meandering correction method of the present invention.

In FIG. 14, (a) illustrates a change in data on the determination EPS edge position values and a change in an operation amount of the final EPC motor 45 when the reference correction value of the line EPC roller 11 is −0.8 mm, and a plurality of electrodes are input from the line EPC unit 10 to the winding core side. That is, the drawing illustrates the change in data on the determination EPS edge position value and the change in operation amount of the final EPC motor 45, which is operated to adjust the final EPC roller 41, over time when the edge position of the electrode is feedback-controlled by adjusting the final EPC roller 41 of the final EPC unit 40 so that the determination EPS edge position value matches the determination EPS edge reference value. As shown in the drawing, when an electrode is input from the line EPC roller 11 under the above reference correction value, pieces of data on determination EPS edge position values measured after the 11th measurement are biased to a value smaller than a determination EPS edge reference value (0.8 mm), and an operation amount of the final EPC motor 45 is biased in a positive (+) direction. In addition, it can be seen that a variation in pieces of data on the determination EPS edge position values of a plurality of electrodes and in operation amount of the final EPC motor 45 is large.

On the other hand, (b) and (d) of FIG. 14 illustrate the result of feedback control so that the (reference correction value) of the line EPC roller 11 of the line EPC unit 10 is corrected by as much as the correction value calculated as the average logic value for every predetermined number of electrode inputs in connection with the feedback control of the final EPC unit 40 according to the control method of the present invention. In FIG. 14, (b) illustrates a change trend in the data on the determination EPS edge position value and a change trend in the operation amount of the final EPC motor 45 when the reference correction value of the line EPC roller 11 is corrected multiple times from −0.8 mm to −0.5 mm, and, in FIG. 14, (c) illustrates a change trend in the data on the determination EPS edge position value and a change trend in the operation amount of the final EPC motor 45 when the reference correction value of the line EPC roller 11 is corrected multiple times from −0.5 mm to −0.25 mm. In (b) of FIG. 14, compared to (a) of FIG. 14, the pieces of data on the determination EPS edge position values converge closer to the determination EPS edge reference value and the change in the operation amount of the final EPC motor 45 is further reduced. It can be seen that, in (c) of FIG. 14, compared to (b) of FIG. 14, the pieces of data on the determination EPS edge position values converge almost to the determination EPS edge reference value and the change in the operation amount of the final EPC motor 45 is much further reduced.

FIG. 15 are graphs illustrating a variation in the operation amount of the final EPC motor before and after the line EPC roller is feedback-controlled for a plurality of electrodes by the meandering correction method of the present invention.

As shown in (a) of FIG. 15, it can be seen that the operation amount of the final EPC motor is minimized and the variation thereof is greatly reduced when the feedback control is performed for thousands of input electrodes as compared to before performing the feedback control on the thousands of input electrodes.

In FIG. 15, (b) illustrates such a variation in a more simplified form and illustrates that the maximum operation amount of the final EPC motor is greatly reduced when the feedback control is performed for a large number of electrodes.

FIG. 16 are graphs illustrating a state in which the determination EPS edge position value is stabilized over time when the input inclination of the input clamp roller is corrected by as much as a predetermined correction value by the meandering correction method of the present invention.

In FIG. 16, (a) illustrates a change in EPS data over time (the number of measurements) when the input inclination is corrected until the final input inclination is 0.25 (a total of 15 corrections) by adjusting the input inclination by as much as a correction value of 0.01 from an initial input inclination of 0.40. As shown in the drawing, it can be seen that the degree of deviation of the initial EPS data from the determination EPS edge reference value is reduced as the correction is repeated.

In FIG. 16, (b) illustrates a case in which the input inclination is corrected from an initial input inclination of 0.27 until the final input inclination is 0.20 (a total of 7 corrections) by adjusting the input inclination by as much as a correction value of 0.01, and, in FIG. 16, (c) illustrates a case in which the input inclination is corrected from an initial input inclination of 0.25 until the final input inclination is 0.20 (a total of 5 corrections) by adjusting the input inclination by as much as a correction value of 0.01. As shown in (c) of FIG. 16, it can be seen that, when the input inclination is changed to 0.20, the initial EPS data converges close to the determination EPS edge reference value, and noise is removed due to the stable input.

FIG. 17 are graphs illustrating a variation of an initial determination EPS edge position value when feedback control is performed by the meandering correction method of the present invention. As shown in (a) of FIG. 17, when feedback control is performed for thousands to tens of thousands of input electrodes, a variation of pieces of initial EPS data is significantly reduced as compared with a case in which the feedback control is not performed. In FIG. 17, (b) illustrates such a variation in a more simplified form, and it can be seen that, when the feedback control is performed on a large number of electrodes after the feedback is applied, the variation of the pieces of initial EPS data approaches 0.00, the input stability is greatly improved, and a variation of positions of the electrodes according to the input is also greatly reduced.

FIG. 18 is a set of graphs respectively illustrating a change in data on the determination EPS edge position value over time and a change in an operation amount of the final EPC motor before feedback control is performed by the meandering correction method of the present invention.

As shown in (a) of FIG. 18, before the line EPC roller and the input clamp roller are feedback-controlled by the present invention, the variation of the initial data of the determination EPS is severe, and pieces of intermediate and later data are biased to be less than the determination EPS edge reference value. In addition, as shown in (b) of FIG. 18, it can be seen that the initial operation amount of the final EPC motor for resolving the meandering is greatly biased to a negative (−) value and then greatly changed to a positive (+) value again.

FIG. 19 is a set of graphs respectively illustrating a change in data on the determination EPS edge position value over time and a change in an operation amount of the final EPC motor after the feedback control is performed by the meandering correction method of the present invention.

As shown in (a) of FIG. 19, it can be seen that, after the line EPC roller and the input clamp roller are feedback-controlled by the present invention, initial data of the determination EPS almost converges to the determination EPS edge reference value over initial, intermediate, and later measurements. In addition, as shown in (b) of FIG. 19, the operation amount (transfer amount) of the final EPC motor for resolving the meandering also converges to a value of 0 and the variation thereof is also significantly reduced, so that according to the present invention, a motor load may be reduced by minimizing the operation amount of the final EPC motor.

As a result, the alignment of the electrode wound around the winding core may also be greatly improved, thereby significantly improving the alignment quality of the jelly-roll electrode assembly manufactured by the meandering correction apparatus and method of the present invention.

In the above, the present invention has been described in more detail with reference to the drawings and embodiments. However, since embodiments described in the present specification and configurations illustrated in the drawings are only one embodiment and do not represent the overall technical spirit of the present invention, it is understood that the present invention covers various equivalents, modifications, and substitutions at the time of filing of this application.

The invention claimed is:

1. An apparatus for correcting meandering of an electrode that is transferred in a roll-to-roll manner to form a jelly-roll electrode assembly by being wound around a winding core, the apparatus comprising:

a line edge position control (EPC) unit including a line EPC roller configured to transfer the electrode to the winding core and to adjust an edge position of the electrode;

an input clamp unit including an input clamp roller configured to receive the electrode from the line EPC roller and input the electrode to the winding core, and an input inclination adjusting mechanism configured to adjust an input inclination of the input clamp roller with respect to an electrode transfer direction;

a final EPC unit including a determination edge position sensor (EPS) configured to measure the edge position of the electrode transferred from the input clamp roller as a determination EPS edge position value, and a final EPC roller configured to adjust the edge position of the electrode to match a determination EPS edge reference value; and a controller configured to control the line EPC unit, the input clamp unit, and the final EPC unit, wherein the controller feedback-controls the edge position of the electrode so that the determination EPS edge position value matches the determination EPS edge reference value, and feedback-controls each of the line EPC unit and the input clamp unit so that a direction in which the electrode is transferred from the line EPC roller is corrected and the input inclination of the input clamp roller is corrected by comparing pieces of data on the determination EPS edge position values when the determination EPS edge position values change over time to converge to the determination EPS edge reference value by the feedback control, and the determination EPS edge reference value.

2. The apparatus of claim 1, wherein the final EPC roller is disposed at a position in front of an installation position of the determination EPS at a predetermined spacing.

3. The apparatus of claim 1, wherein the controller includes:

a first controller configured to feedback control the edge position of the electrode by adjusting the final EPC roller so that the determination EPS edge position value matches the determination EPS edge reference value; and a second controller configured to feedback control each of the line EPC unit and the input clamp unit so that the direction in which the electrode is transferred from the line EPC roller is corrected and the input inclination of the input clamp roller is corrected by comparing the pieces of data on the determination EPS edge position values when the determination EPS edge position values change over time to converge to the determination EPS edge reference value by the feedback control of the first controller and the input clamp unit, and the determination EPS edge reference value.

4. The apparatus of claim 3, wherein the controller further includes a third controller configured to control the edge position of the electrode by adjusting a position of the line EPC roller by the feedback control of the second controller.

5. The apparatus of claim 1, wherein the controller feedback-controls the line EPC unit by comparing data values measured on the determination EPS edge position values in intermediate and later measurements and the determination EPS edge reference value, among the pieces of data on the determination EPS edge position values measured a predetermined number of times at predetermined time intervals until the determination EPS edge position values converge to the determination EPS edge reference value.

6. The apparatus of claim 5, wherein the controller defines a value, which is obtained by averaging difference values between each of the pieces of data on the determination EPS edge position values in the intermediate and later measurements and the determination EPS edge reference value, as a logic value for the feedback control of the line EPC roller, and wherein the controller calculates a value obtained by averaging the logic values of each electrode when the electrode is input a predetermined number of times as a line EPC roller correction value of the line EPC unit and performs the feedback control so that a position of the line EPC roller is corrected by as much as the correction value for every predetermined number of inputs of the electrode.

7. The apparatus of claim 6, wherein a value obtained by multiplying the logic value by a predetermined correction factor, which reflects a measurement error of the determination EPS due to an unexpected variable, is set as the logic value.

8. The apparatus of claim 1, wherein the controller calculates a difference value between an average value of initial data values among the pieces of data on the determination EPS edge position values measured a predetermined number of times at predetermined time intervals until the determination EPS edge position values converge to the determination EPS edge reference value and the determination EPS edge reference value and defines the difference value as a logic value for the feedback control of the input clamp roller, and wherein the controller obtains an average logic value by averaging the logic values of each electrode when the electrode is input a predetermined number of times and performs the feedback control to correct the input inclination of the input clamp roller for every predetermined number of inputs of the electrode in response to a magnitude of the average logic value.

9. The apparatus of claim 8, wherein a correction period is varied according to a magnitude of an absolute value of the average logic value, and the input inclination is corrected by as much as a predetermined set correction value for each correction period.

10. The apparatus of claim 8, wherein a value obtained by multiplying the logic value by a predetermined correction factor, which reflects a measurement error of the determination EPS due to an unexpected variable, is set as the logic value.

11. A method of correcting meandering of an electrode that is transferred in a roll-to-roll manner to form a jelly-roll electrode assembly by being wound around a winding core, the method comprising:

measuring a determination edge position sensor (EPS) edge position value by measuring an edge position of the electrode when the electrode, which is sequentially transferred through a line edge position control (EPC) roller of a line EPC unit and an input clamp roller of an input clamp unit, reaches a determination EPS of a final EPC unit, which is disposed before the winding core, by the determination EPS;

feedback-controlling, by a controller, the edge position of the electrode so that the determination EPS edge position value matches a predetermined determination EPS edge reference value;

obtaining pieces of data on the determination EPS edge position values when the determination EPS edge position values change over time to converge to the determination EPS edge reference value by the feedback control; and feedback-controlling each of the line EPC unit and the input clamp unit so that a direction in which the electrode is transferred from the line EPC roller is corrected and an input inclination of the input clamp roller is corrected by comparing the pieces of data on the determination EPS edge position values and the determination EPS edge reference value.

12. The method of claim 11, wherein the pieces of data on the determination EPS edge position values, which change over time, are obtained by performing a measurement a predetermined number of times at predetermined time intervals until the pieces of data converge to the determination EPS edge reference value, and wherein the line EPC unit is feedback-controlled by comparing data values on the determination EPS edge position values of intermediate and later measurements among the pieces of measured data and the determination EPS edge reference value.

13. The method of claim 12, wherein a value, which is obtained by averaging difference values between each of the pieces of data on the determination EPS edge position values in the intermediate and later measurements and the determination EPS edge reference value, is defined as a logic value for the feedback control of the line EPC unit, and wherein a value obtained by averaging the logic values of each electrode when the electrode is input a predetermined number of times is calculated as a line EPC roller correction value of the line EPC unit and the feedback control is performed so that the position of the line EPC roller is corrected by as much as the correction value for every predetermined number of inputs of the electrode.

14. The method of claim 13, wherein a value obtained by multiplying the logic value by a predetermined correction factor, which reflects a measurement error of the determination EPS due to an unexpected variable, is set as the logic value.

15. The method of claim 11, wherein a difference value between an average value of initial data values among the pieces of data on the determination EPS edge position values measured a predetermined number of times at predetermined time intervals until the determination EPS edge position values converge to the determination EPS edge reference value and the determination EPS edge reference value is calculated and the difference value is defined as a logic value for the feedback control of the input clamp roller, and wherein an average logic value is obtained by averaging the logic values of each electrode when the electrodes are input a predetermined number of times, and the feedback control is performed to correct the input inclination of the input clamp roller for every predetermined number of inputs of the electrode in response to a magnitude of the average logic value.

16. The method of claim 15, wherein the input inclination is corrected by varying a correction period according to a magnitude of an absolute value of the average logic value.

17. The method of claim 16, wherein the input inclination is corrected by as much as a predetermined set correction value for each correction period.

18. The method of claim 15, wherein a value obtained by multiplying the difference value by a predetermined correction factor, which reflects a measurement error of the determination EPS due to an unexpected variable, is set as the logic value, and wherein the input inclination of the input clamp roller is corrected in response the magnitude of the logic value.

* * * * *